US012185396B2

(12) United States Patent
Qi et al.

(10) Patent No.: US 12,185,396 B2
(45) Date of Patent: Dec. 31, 2024

(54) APPARATUS THAT OPERATES WITH A NEIGHBOR AWARENESS NETWORKING (NAN) PROTOCOL, METHOD FOR SIGNALING OPERATION INFORMATION AND TRANSMIT POWER INFORMATION FOR DEVICE-TO-DEVICE COMMUNICATION

(71) Applicant: Intel Corporation, Santa Clara, CA (US)

(72) Inventors: Emily Qi, Gig Harbor, WA (US); Carlos Cordeiro, Portland, OR (US); Ehud Reshef, Qiryat Tivon (IL); Hassan Yaghoobi, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 879 days.

(21) Appl. No.: 17/111,541

(22) Filed: Dec. 4, 2020

(65) Prior Publication Data
US 2021/0153273 A1    May 20, 2021

(51) Int. Cl.
*H04W 76/14*   (2018.01)
*H04L 9/00*    (2022.01)
*H04L 9/40*    (2022.01)
*H04L 12/46*   (2006.01)
*H04W 84/12*   (2009.01)

(52) U.S. Cl.
CPC ............ *H04W 76/14* (2018.02); *H04L 9/00* (2013.01); *H04L 9/40* (2022.05); *H04L 12/4604* (2013.01); *H04W 84/12* (2013.01)

(58) Field of Classification Search
None
See application file for complete search history.

(56) References Cited

U.S. PATENT DOCUMENTS

| 10,349,364 | B1 * | 7/2019 | Lambert | H04W 84/18 |
| 2009/0124301 | A1 * | 5/2009 | Raissinia | H04W 52/0216 455/574 |
| 2015/0103708 | A1 * | 4/2015 | Kang | H04W 4/80 370/329 |
| 2018/0041349 | A1 * | 2/2018 | Jung | H04L 12/12 |
| 2019/0380022 | A1 * | 12/2019 | Sambe | H04L 67/51 |
| 2022/0217737 | A1 * | 7/2022 | Wang | H04L 5/0007 |

* cited by examiner

*Primary Examiner* — Haris Sabah
(74) *Attorney, Agent, or Firm* — East IP P.C.

(57) ABSTRACT

Provided herein are apparatus and methods for signaling regulatory information and transmit power information for device-to-device communication. An apparatus for a Wi-Fi device comprising: a RF interface; and processor circuitry coupled with the RF interface. The processor circuitry is to: decode a first discovery frame received from a peer Wi-Fi device via the RF interface to obtain a first Operation Information attribute of the peer Wi-Fi device, wherein the first Operation Information attribute is to indicate a first operation mode of the peer Wi-Fi device; and encode, in response to the first discovery frame, a second discovery frame for transmission to the peer Wi-Fi device via the RF interface, wherein the second discovery frame includes a second Operation Information attribute of the Wi-Fi device to indicate a second operation mode of the Wi-Fi device. Other embodiments may also be disclosed and claimed.

21 Claims, 15 Drawing Sheets

400 decode a first discovery frame received from a peer Wi-Fi device to obtain a first Operation Information attribute of the peer Wi-Fi device — 410 encode, in response to the first discovery frame, a second discovery frame for transmission to the peer Wi-Fi device — 420

FIG. 4

APPARATUS THAT OPERATES WITH A NEIGHBOR AWARENESS NETWORKING (NAN) PROTOCOL, METHOD FOR SIGNALING OPERATION INFORMATION AND TRANSMIT POWER INFORMATION FOR DEVICE-TO-DEVICE COMMUNICATION

TECHNICAL FIELD

Embodiments of the present disclosure generally relate to wireless communications, and in particular to apparatus and methods for signaling operation information and transmit power information for device-to-device communication.

BACKGROUND ART

More and more wireless devices are deployed and more and more studies focus on device-to-device communication. As new spectrum resources are available to the device-to-device communication, technical solutions are required about the device-to-device communication with the new spectrum resources.

BRIEF DESCRIPTION OF THE DRAWINGS

Embodiments of the disclosure will be illustrated, by way of example and not limitation, in the figures of the accompanying drawings in which like reference numerals refer to similar elements.

FIG. 4 illustrates a flowchart of a method for signaling operation information and transmit power information for a discovery procedure of device-to-device communication in accordance with one or more example embodiments of the present disclosure.

DETAILED DESCRIPTION OF EMBODIMENTS

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

With the opening of 1200 MHz of spectrum in 6 GHz (5925-7125 MHz) for unlicensed operation in the US, UK, South Korea, Brazil, etc., and half that amount in the EU and other countries, there is a strong desire to setup device-to-device communication in 6 GHz band. For example, using device-to-device communication in 6 GHz for wireless display and virtual reality/augmented reality (VR/AR) to improve user experience.

Figure 1:
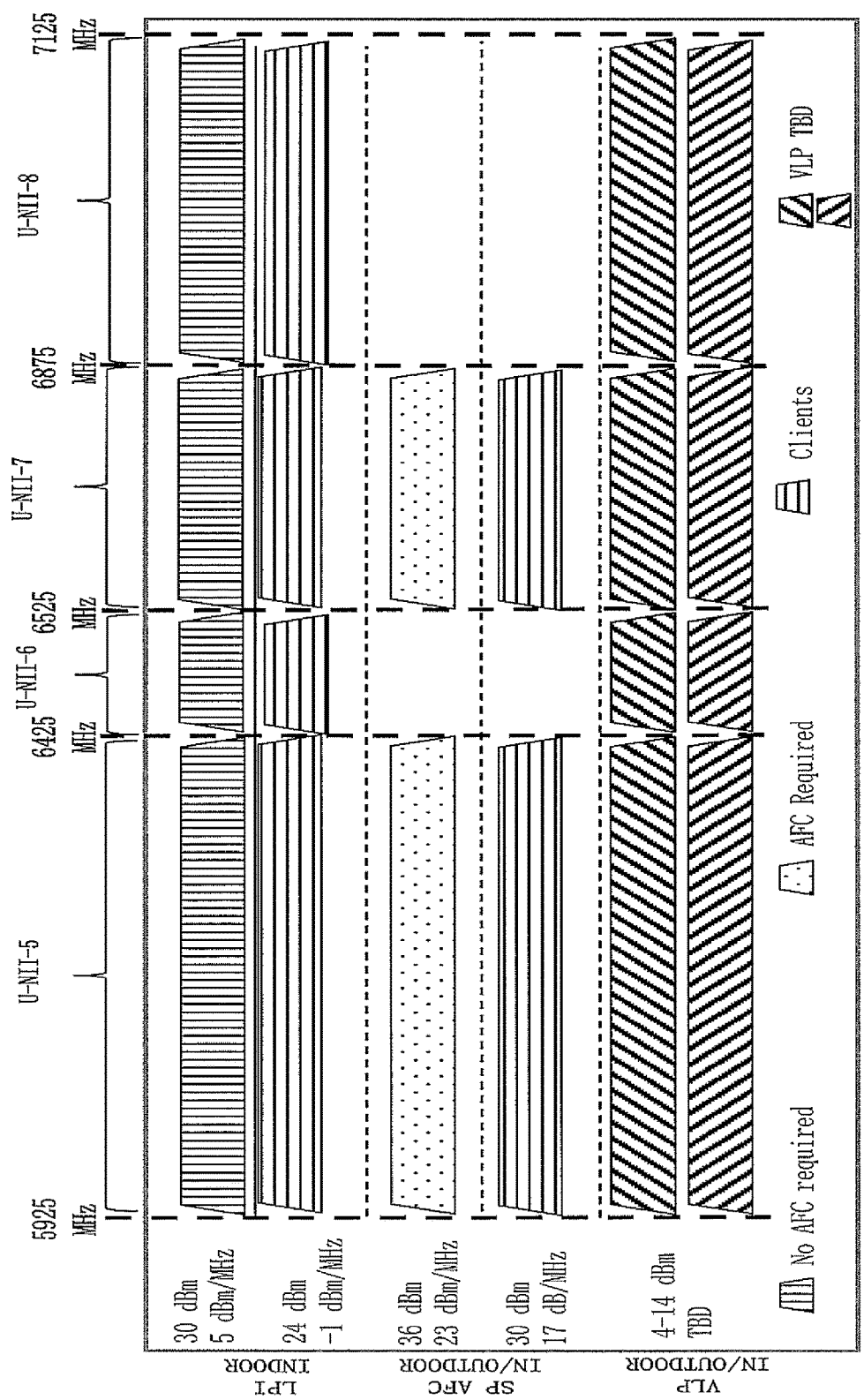
FIG. 1 illustrates an example of transmission power limit for 6 GHz band in accordance with some embodiments of the present disclosure.

FIG. 1 illustrates an example of transmission power limit for 6 GHz band in accordance with some embodiments of the present disclosure.

As shown in FIG. 1, an Automated Frequency Coordination (AFC) required case, a no AFC required case, a client case, and a Very Low Power to be fined (VLP TBD) case are illustrated. Also, different Unlicensed National Information Infrastructures (U-NIIs) are illustrated. FIG. 1 is an example, and the present disclosure is not limited in this respect.

In general, there are four regulatory operation modes in 6 GHz. They are: Standard Power (SP), Low Power Indoor (LPI), Very Low Power (VLP) and VLP on-body. In each operation mode, the allowed transmission power is different. FIG. 1 illustrates the allowed transmission power limits for unlicensed operation in 6 GHz bands in US. In some regulatory domain, the allowed transmit power may vary depending on whether the device is on-body or not, or of a specific form factor or whether the device is indoor or outdoor. For example, in general, the target maximum transmit power for VLP operation mode could be up to 14 dBm in US. If one of the devices is on-body, then the pair may experience higher loss, and hence may be able to operate with higher transmit power at 14 dBm without causing harmless interference into incumbent link. Devices with specific form factors, may also be categorized with specific max Tx powers. Other channel impairments such as body proximity, table and other clutter losses may have similar impact as on body loss. Higher transmit power is to improve packet rate and maintain the required service throughput and performance. Therefore, promptly communicating device's capabilities (device class, form factor or regulatory requirement) involved with max Tx power information to the peer device may ensure compliance while improves the performance of device-to-device communication.

This disclosure provides a mechanism to allow the device to dynamically signal its class, form factor or regulatory information and transmit power to the peer device so that the peer device can promptly update the transmit power configuration. The proposed mechanism in this disclosure is generic and can be applicable to both Wi-Fi Aware and Wi-Fi Direct technologies.

In the present disclosure, a new attribute: "Operation Information" attribute is defined. An Operation Information attribute may include device class, form factor, or regulatory information. For different type of device or different form factor, the allowed maximum transmit power is different. For example, exchanging and updating regulatory information allows the peer device to operate at regulatory allowed maximum transmit power level.

Figure 2:
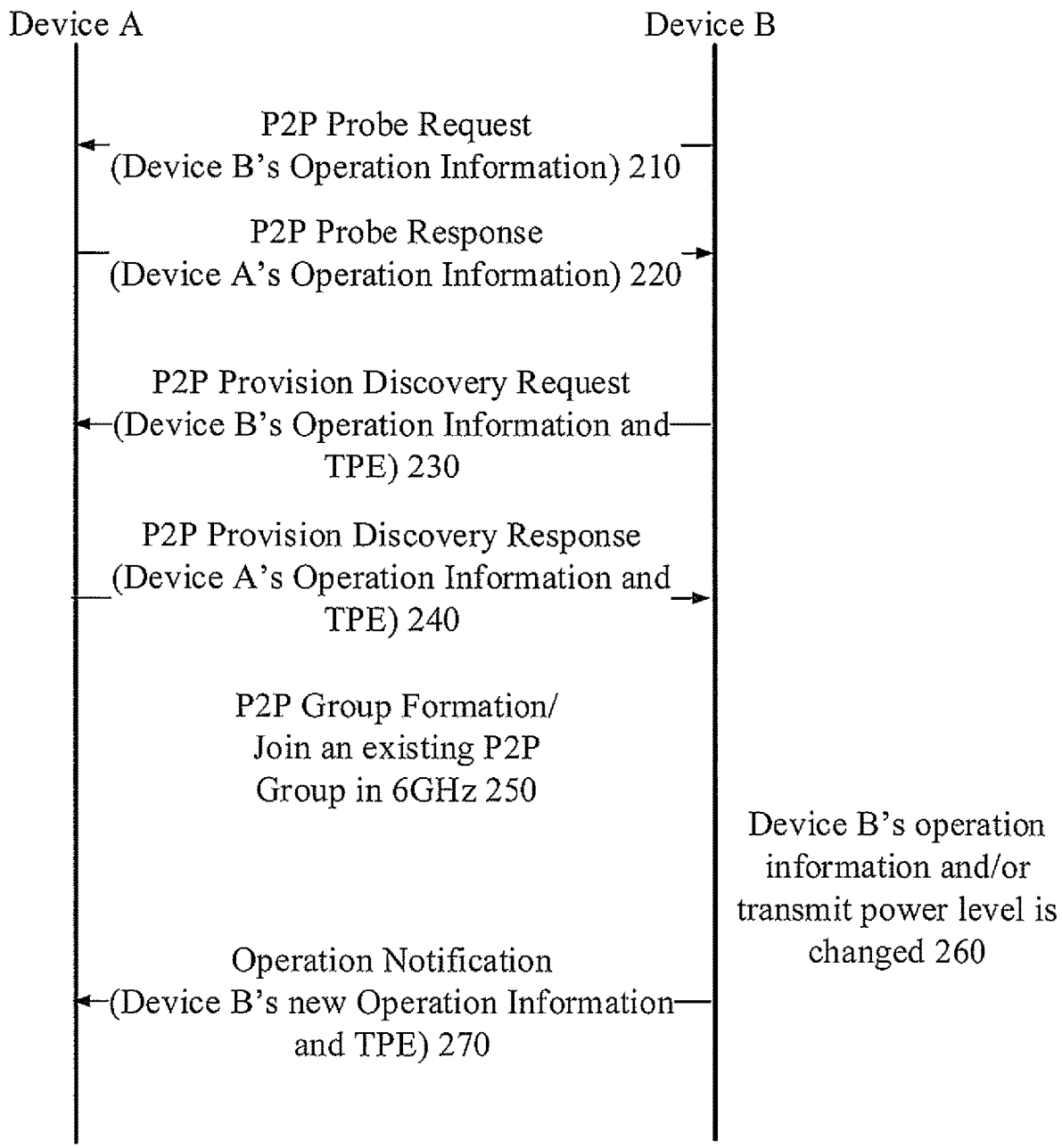
FIG. 2 illustrates a communication diagram for signaling operation information and transmit power information in Wi-Fi Direct context in accordance with one or more example embodiments of the present disclosure.

FIG. 2 illustrates a communication diagram 200 for signaling operation information and transmit power information in Wi-Fi Direct context in accordance with one or more example embodiments of the present disclosure.

As shown in FIG. 2, device A and device B may communicate with each other. In the example of FIG. 2. Both of device A and device B may act as Wi-Fi Direct devices and thus operates with a peer-to-peer (P2P) protocol(s).

The communication diagram 200 in FIG. 2 illustrates three procedures: a discovery procedure, a setup procedure, and an update notification procedure.

During the discovery procedure, for example, the device B may transmit a P2P Probe Request frame to the device A at 210. The P2P Probe Request frame may include device B's operation information (e.g., via an Operation Information attribute). At 220, the device A may transmit a P2P Probe Response frame to the device B in response to the P2P Probe Request frame. The P2P Probe Response frame may include device A's operation information (e.g., via an Operation Information attribute).

In some embodiments, instead of the P2P Probe Request/Response frame, the devices may discover each other with Beacon frames. In some other embodiments, the devices may discover each other with other frames. The disclosure is not limited in this respect.

During the setup procedure, for example, the device B may transmit a P2P Provision Discovery Request frame to the device A at 230. The P2P Provision Discovery Request frame may include device B's operation information (e.g., via an Operation Information attribute) and/or transmit power level (e.g., via a Transmit Power Envelope (TEP) element). At 240, the device A may transmit a P2P Provision Discovery Response frame to the device B in response to the P2P Provision Discovery Request frame. The P2P Provision Discovery Response frame may include device A's operation information (e.g., via an Operation Information attribute) and/or transmit power level (e.g., via a TEP element). In this way, the device A and the device B may setup a P2P link, and thus form a P2P group or join an existing P2P group in 6 GHz at 250.

In some embodiments, the P2P Provision Discovery Request/Response frame may further include a Country element to indicate regulatory domain information of the device B/A.

In some embodiments, the devices may setup the P2P link with other frames. The disclosure is not limited in this respect.

During the update notification procedure, if a device's operation information or transmit power level are changed, the device will notify the peer device by transmitting a notification update frame including the Operation Information attribute and TPE element. For example, as shown in FIG. 2, the device B's operation information and/or transmit power level may be changed at 260, for example, the device B's regulatory information is changed, e.g., the device B is moving form outdoor to indoor. Then at 270, the device B may transmit a new notification frame, Operation Notification frame, to the device A. The Operation Notification frame may include device B's new operation information (e.g., via an Operation Information attribute) and/or transmit power level (e.g., via a TEP element). Then the device A may update its operation information and/or transmit power level accordingly.

In some embodiments where the device B operates as a Group Owner, it may transmit a Beacon frame to notify its new operation information and/or transmit power level. In some other embodiments, the devices may notification the update with other frames. The disclosure is not limited in this respect.

In some embodiments, the operation information include, but not limited to, regulatory information, device class information, form factor information, and the like.

FIG. 2 above illustrates signaling of operation information and transmit power information in Wi-Fi Direct context. Below, FIG. 3 illustrates a communication diagram 300 for signaling operation information and transmit power information in Wi-Fi Aware context in accordance with one or more example embodiments of the present disclosure.

Figure 3:
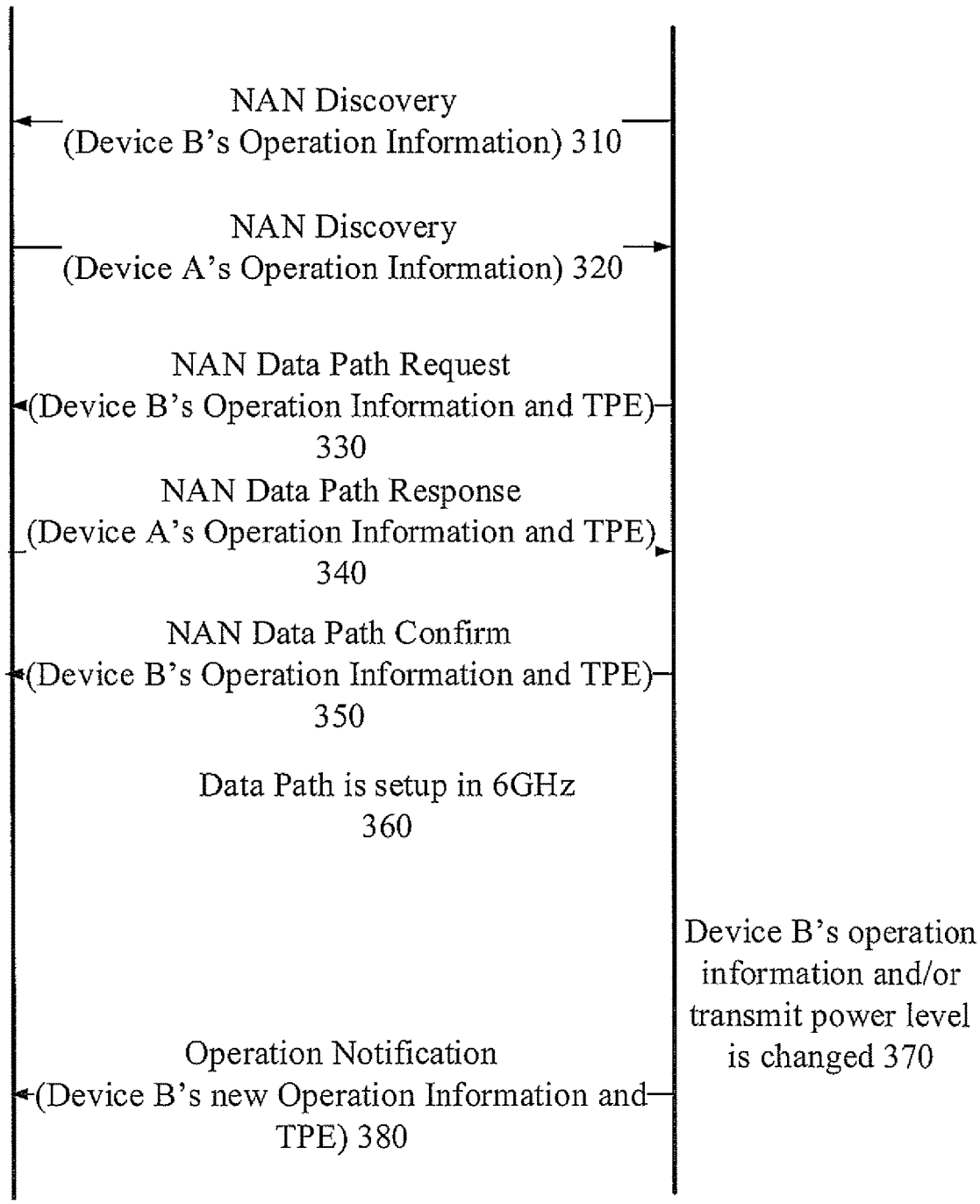
FIG. 3 illustrates a communication diagram for signaling operation information and transmit power information in Wi-Fi Aware context in accordance with one or more example embodiments of the present disclosure.

As shown in FIG. 3, device A and device B may communicate with each other. In the example of FIG. 3. Both of device A and device B may act as Wi-Fi Aware devices and thus operates with a Neighbor Awareness Networking (NAN) protocol(s).

The communication diagram 300 in FIG. 3 illustrates three procedures: a discovery procedure, a setup procedure, and an update notification procedure.

During the discovery procedure, for example, the device B may transmit a first NAN Discovery frame to the device A at 310. The first NAN Discovery frame may include device B's operation information (e.g., via an Operation Information attribute). At 320, the device A may transmit a second NAN Discovery frame to the device B in response to the first NAN Discovery frame. The second NAN Discovery frame may include device A's operation information (e.g., via an Operation Information attribute). The Operation Information attribute herein may include 6 GHz operation information. In addition, this attribute can be extended to include other operation information, for example, 5.9 GHz information. The disclosure is not limited in this respect.

In some embodiments, the devices may discover each other with other frames. The disclosure is not limited in this respect.

During the setup procedure, for example, the device B may transmit a NAN Data Path Request frame to the device A at 330. The NAN Data Path Request frame may include device B's operation information (e.g., via an Operation Information attribute) and/or transmit power level (e.g., via a TEP element). At 340, the device A may transmit a NAN Data Path Response frame to the device B in response to the NAN Data Path Request frame. The NAN Data Path Response frame may include device A's operation information (e.g., via an Operation Information attribute) and/or transmit power level (e.g., via a TEP element). At 350, the device B may transmit a NAN Data Path Confirm frame to the device A to confirm reception of the NAN Data Path Response frame from the device A. In this way, the device A and the device B may setup a data path in 6 GHz at 360.

In some embodiments, the NAN Data Path Request/Response frame may further include a Country element to indicate regulatory domain information of the device B/A.

In some embodiments, the devices may setup a ranging, a schedule and the like between the device pair with Ranging Request/Response frames, Schedule Request/Response frames and the like. The disclosure is not limited in this respect.

During the update notification procedure, for example, the device B's operation information and/or transmit power level may be changed at 370. Then at 380, the device B may transmit a new notification frame, Operation Notification frame, to the device A. The Operation Notification frame may include device B's new operation information (e.g., an Operation Information attribute) and/or transmit power level (e.g., a TEP element). Then the device A may update its operation information and/or transmit power level accordingly.

In some embodiments, the devices may notification the update with Schedule Update Notification frame. In some other embodiments, the devices may notification the update with other frames. The disclosure is not limited in this respect.

Below, an example of an Operation Information attribute is illustrated in Table 1.

TABLE 1

Example of Operation Information attribute

| Field | Size (octets) | Value | Description |
|---|---|---|---|
| Attribute ID | 1 | 0x0F | Identifies the type of NAN (Wi-Fi Aware) attribute or P2P (Wi-Fi Direct) attribute |
| Length | 1 or 2 | Variable | Length of the following fields in the attribute. The size is 1 octet if it is a P2P attribute. The size is 2 if it is a NAN attribute. |
| Device Class/Form Factor | 1 | Variable | Identifies the type of device and form factor. For example, a device is wearable device. |
| Operation Information | 1 | Variable | 0: 6 GHz VLP device<br>1: 6 GHZ VLP on-body device<br>2: 6 GHz LPI device<br>3: SP device<br>4-255: reserved. |

In Table 1, VLP device, VLP on-body device, LPI device and SP device are illustrated, which are merely examples in some embodiments. Alternatively of additionally, in some other embodiments, 6 GHz devices may include a Watch device, an Internet of Things (IOT) device, a Handset device, a Tablet, a Laptop and the like. In some embodiments, 6 GHz devices may include other devices, and the disclosure is not limited in this respect.

As mentioned above, the Operation Notification frame is newly defined in the disclosure. The newly defined Operation Information attribute and the TPE element may be carried in the Operation Notification frame. The Operation Notification frame may also include a Country element or any other information elements defined in Institute of Electrical and Electronics Engineers (IEEE) 802.11-2016 and any other attributes defined in Wi-Fi Aware/Wi-Fi Direct technical specification. If the device's operation information changes, the device can notify the peer device by sending Operation Notification frame, so that both devices can operate at corresponding transmit power level.

Below, an example format of an Operation Notification frame is illustrated in Table 2. For example, for Wi-Fi Aware, the Operation Notification frame may be referred to as a Wi-Fi Aware (NAN) action frame; and for Wi-Fi Direct, the Operation Notification frame may be referred to as a Wi-Fi Direct (P2P) public action frame. However, the present disclosure is not limited in

TABLE 2

Example format of Operation Notification frame

| Field | Size (Octets) | Value (Hex) | Description |
|---|---|---|---|
| Category | 1 | 0x04 or 0x09 | IEEE 802.11 Public Action frame or IEEE 802.11 Protected Dual of Public Action frame. |
| Action | 1 | 0x09 | IEEE 802.11 Public Action frame Vendor Specific |
| Organizationally Unique Identifier (OUI) | 3 | 0x50-6F-9A | Wi-Fi Alliance specific OUI |
| OUI Type | 1 | 0x09 or 0x18 | Identifying the type and version of Wi-Fi Direct or Wi-Fi Aware.<br>0x09: Wi-Fi Direct.<br>0x18: Wi-Fi Aware. |
| OUI Subtype | 1 | Variable | Identifying the type of Wi-Fi Direct Action frame or Wi-Fi Aware Action frame. |

TABLE 2-continued

Example format of Operation Notification frame

| Field | Size (Octets) | Value (Hex) | Description |
|---|---|---|---|
| Information Content | Variable | Variable | For example,<br>Value X: identify Operation Notification frame for Wi-Fi Direct.<br>Value Y: identify Operation Notification frame for Wi-Fi Aware.<br>Value X could be the same as Value Y.<br>For Wi-Fi Direct frame, this field includes the Dialog Taken field and P2P IE or any information element defined in IEEE 802.11.<br>For Wi-Fi Aware frame, this field Includes fields and/or attributes for each specific NAN action frames. |

As shown in Table 2, among other things, the Operation Notification frame includes Information Content. Below, Table 3 and Table 4 illustrates examples of the Information Content of the Operation Notification frame for Wi-Fi Direct operation and Wi-Fi Aware operation respectively.

TABLE 3

Example of Information Content of Operation Notification frame for Wi-Fi Direct operation

| Field, Element or Attribute | Size (Octets) | Value (Hex) | Description |
|---|---|---|---|
| Dialog Token field | 1 | | Set to a nonzero value to identify the request/response transaction. |
| Transmit Power Envelope element | variable | | Indicate transmit power level as defined in IEEE 802.11ax D8.0(October 2020) |
| Country element | variable | | Indicate regulatory domain information as defined in IEEE 802.11ax D8.0. Optionally present. |
| P2P element | variable | | P2P element includes the Operation Information attribute, or any other attributes defined in Wi-Fi Peer-to-Peer (P2P) technical specification Version 1.7. |
| ... | | | |

TABLE 4

Example of Information Content of Operation Notification frame for Wi-Fi Aware operation

| Field, Element or Attribute | Size (Octets) | Value (Hex) | Description |
|---|---|---|---|
| Operation Information attribute | 4 | | As defined in this invention. |
| Element Container attribute | variable | | Element Container attribute includes Transmit Power Envelop element, Country element (optional), and any other elements as defined in IEEE REVmd D5.0 and IEEE 802.11ax D8.0 |
| ... | | | |

Table 3 and Table 4 are examples of the Information Content of Operation Notification frame. In some embodiments, alternatively or additionally, the Information Content of Operation Notification frame may include other field(s), element(s) or attribute(s). The disclosure is not limited in this respect.

FIG. 4 illustrates a flowchart of a method 400 for signaling operation information and transmit power information for a discovery procedure of device-to-device communication in accordance with one or more example embodiments of the present disclosure. The method 400 may be performed by a Wi-Fi device, e.g., device A of FIG. 2 and FIG. 3.

At 410, a first discovery frame received from a peer Wi-Fi device is decoded to obtain a first Operation Information attribute of the peer Wi-Fi device. The first Operation Information attribute is to indicate a first operation mode of the peer Wi-Fi device At 420, in response to the first discovery frame, a second discovery frame is encoded, for transmission to the peer Wi-Fi device. The second discovery frame includes a second Operation Information attribute of the Wi-Fi device to indicate a second operation mode of the Wi-Fi device.

In some embodiments where the Wi-Fi device and the peer Wi-Fi device are operable with Wi-Fi Direct technology, the first discovery frame may include a Probe Request frame, and the second discovery frame may include a Probe Response frame; or the first discovery frame may include a first Beacon frame, and the second discovery frame may include a second Beacon frame.

In some embodiments where the Wi-Fi device and the peer Wi-Fi device are operable with Wi-Fi Aware technology, the first discovery frame may include a first NAN Discovery frame, and the second discovery frame may include a second NAN Discovery frame.

In some embodiments, the first operation mode and the second operation mode are operable in in all IEEE 802.11 country elements and operating classes (Ref 802.11 Annex E).

In some embodiments, the first operation mode and the second operation mode each includes all device class/categories, form factors or other regulatory information as specified in the Wi-Fi or non-Wi-Fi protocol.

In some embodiments, each of the first operation mode and the second operation mode includes SP mode, LPI mode, VLP mode, VLP On-body mode, device class/category, form factor or any other regulatory information.

Figure 5:
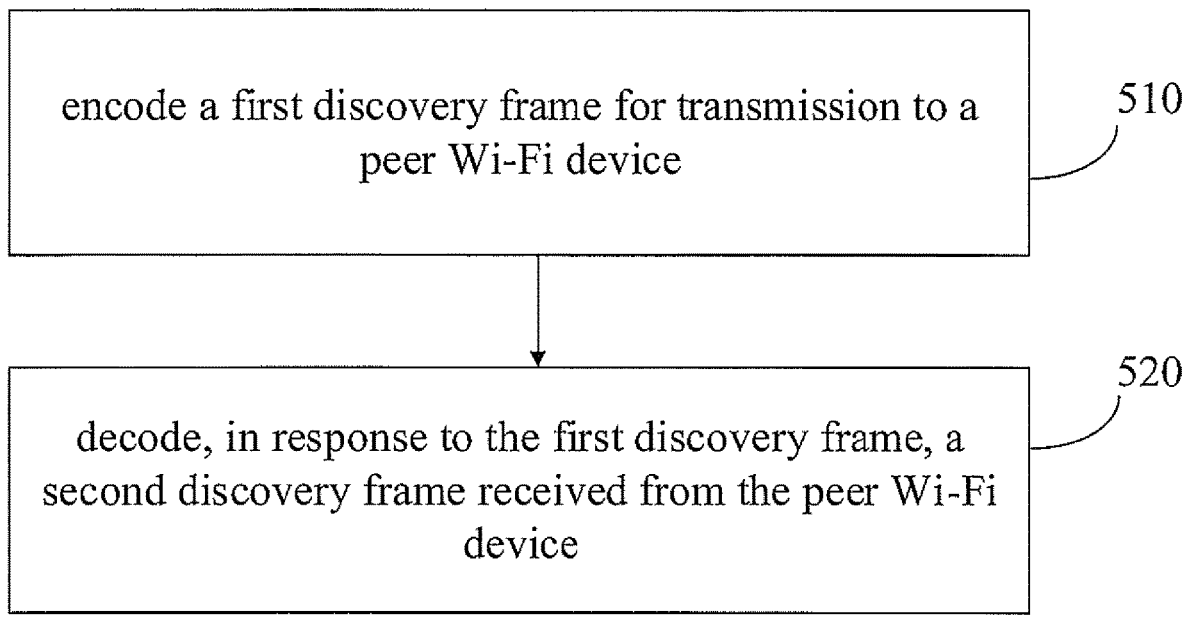
FIG. 5 illustrates a flowchart of a method for signaling operation information and transmit power information for a discovery procedure of device-to-device communication in accordance with one or more example embodiments of the present disclosure.

The method 400 in FIG. 4 is described from a perspective of device A, for example. FIG. 5 below will describe a method from a perspective of device B, for example. FIG. 5 illustrates a flowchart of a method 500 for signaling operation information and transmit power information for a discovery procedure of device-to-device communication in accordance with one or more example embodiments of the present disclosure. The method 500 may be performed by a Wi-Fi device, e.g., device B of FIG. 2 and FIG. 3.

Figure 6:
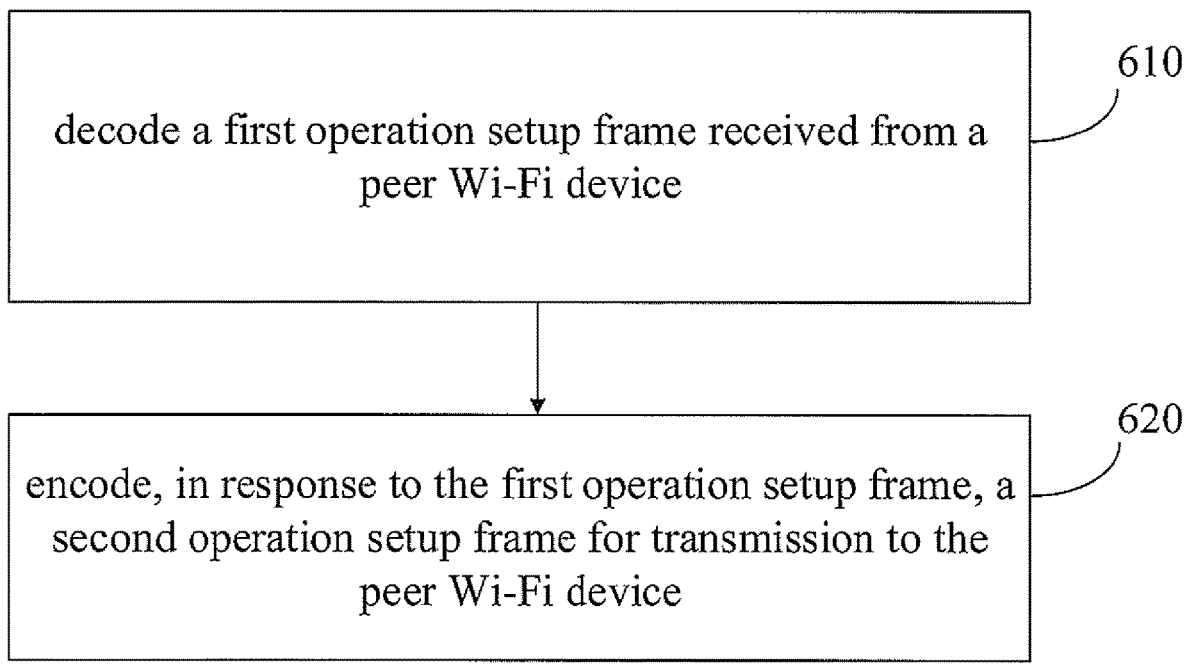
FIG. 6 illustrates a flowchart of a method for signaling operation information and transmit power information for a setup procedure of device-to-device communication in accordance with one or more example embodiments of the present disclosure.

At 510, a first discovery frame is encoded for transmission to a peer Wi-Fi device. The first discovery frame may include a first Operation Information attribute to indicate a first operation mode of the Wi-Fi device At 520, in response to the first discovery frame, a second discovery frame received from the peer Wi-Fi device is decoded. The second discovery frame may include a second Operation Information attribute to indicate a second operation mode of the peer Wi-Fi device FIG. 6 illustrates a flowchart of a method 600 for signaling operation information and transmit power information for a setup procedure of device-to-device communication in accordance with one or more example embodiments of the present disclosure. The method 600 may be performed by a Wi-Fi device, e.g., device A of FIG. 2 and FIG. 3.

At 610, a first operation setup frame received from a peer Wi-Fi device is decoded. The first operation setup frame may include a first Operation Information attribute of the peer Wi-Fi device to indicate a first operation mode of the peer Wi-Fi device.

At 620, in response to the first operation setup frame, a second operation setup frame is encoded for transmission to the peer Wi-Fi device. The second operation setup frame may include a second Operation Information attribute of the Wi-Fi device to indicate a second operation mode of the Wi-Fi device.

In some embodiments, the first operation setup frame may further include an explicit first TPE element to indicate a first transmit power level of the peer Wi-Fi device, and the second operation setup frame may further include an explicit second TPE element to indicate a second transmit power level of the Wi-Fi device In some embodiments where the Wi-Fi device and the peer Wi-Fi device are operable with Wi-Fi Direct technology, the first operation setup frame includes a Provision Discovery Request frame, and the second operation setup frame includes a Provision Discovery Response frame.

In some embodiments where the Wi-Fi device and the peer Wi-Fi device are operable with Wi-Fi Aware technology, the first operation setup frame includes a first Data Path Request frame, and the second operation setup frame includes a second Data Path Response frame; the first operation setup frame includes a first Ranging Request frame, and the second operation setup frame includes a second Ranging Response frame; or the first operation setup frame includes a first Schedule Request frame, and the second operation setup frame includes a second Schedule Response frame.

In some embodiments, the first operation setup frame further includes a first Country element to indicate regulatory domain information of the peer Wi-Fi device, and the second operation setup frame further includes a second Country element to indicate regulatory domain information of the Wi-Fi device.

Figure 7:
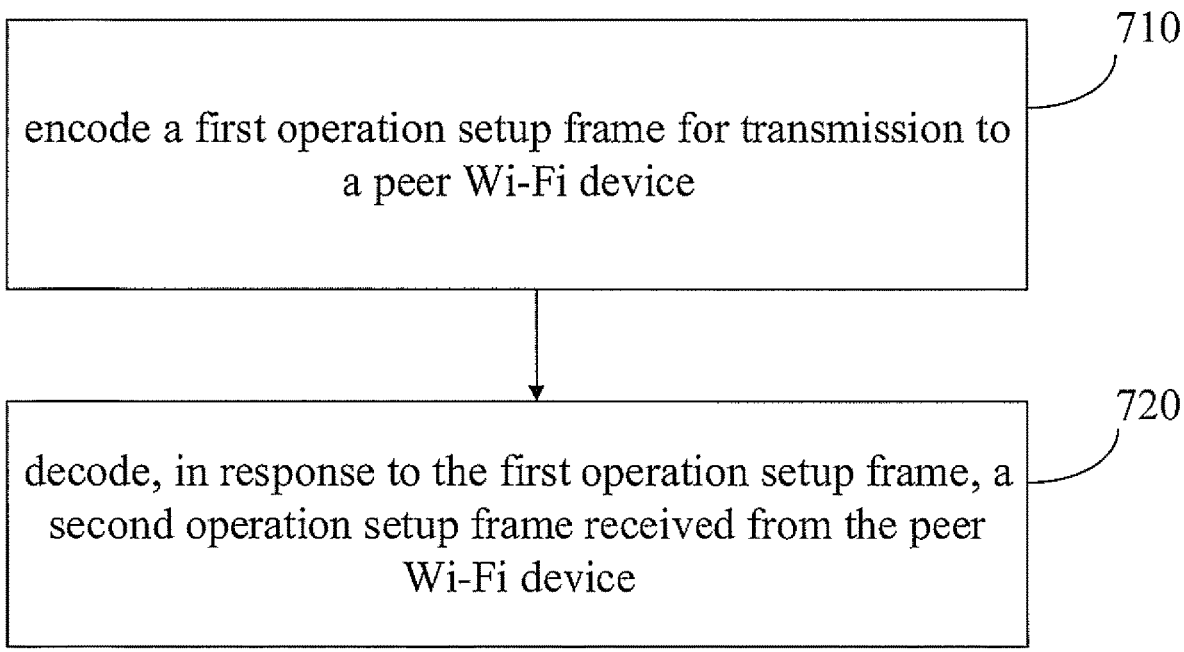
FIG. 7 illustrates a flowchart of a method for signaling operation information and transmit power information for a setup procedure of device-to-device communication in accordance with one or more example embodiments of the present disclosure.

The method 600 in FIG. 6 is described from a perspective of device A, for example. FIG. 7 below will describe a method from a perspective of device B, for example. FIG. 7 illustrates a flowchart of a method 700 for signaling operation information and transmit power information for a setup procedure of device-to-device communication in accordance with one or more example embodiments of the present disclosure. The method 700 may be performed by a Wi-Fi device, e.g., device B of FIG. 2 and FIG. 3.

At 710, a first operation setup frame is encoded for transmission to a peer Wi-Fi device. The first operation setup frame may include a first Operation Information attribute to indicate a first operation mode of the Wi-Fi device and a first TPE element of the Wi-Fi device to indicate a first transmit power level of the Wi-Fi device.

At 720, in response to the first operation setup frame, a second operation setup frame received from the peer Wi-Fi device is decoded. The second operation setup frame may include a second Operation Information attribute to indicate a second operation mode of the peer Wi-Fi device and a second TPE element to indicate a second transmit power level of the peer Wi-Fi device.

Figure 8:
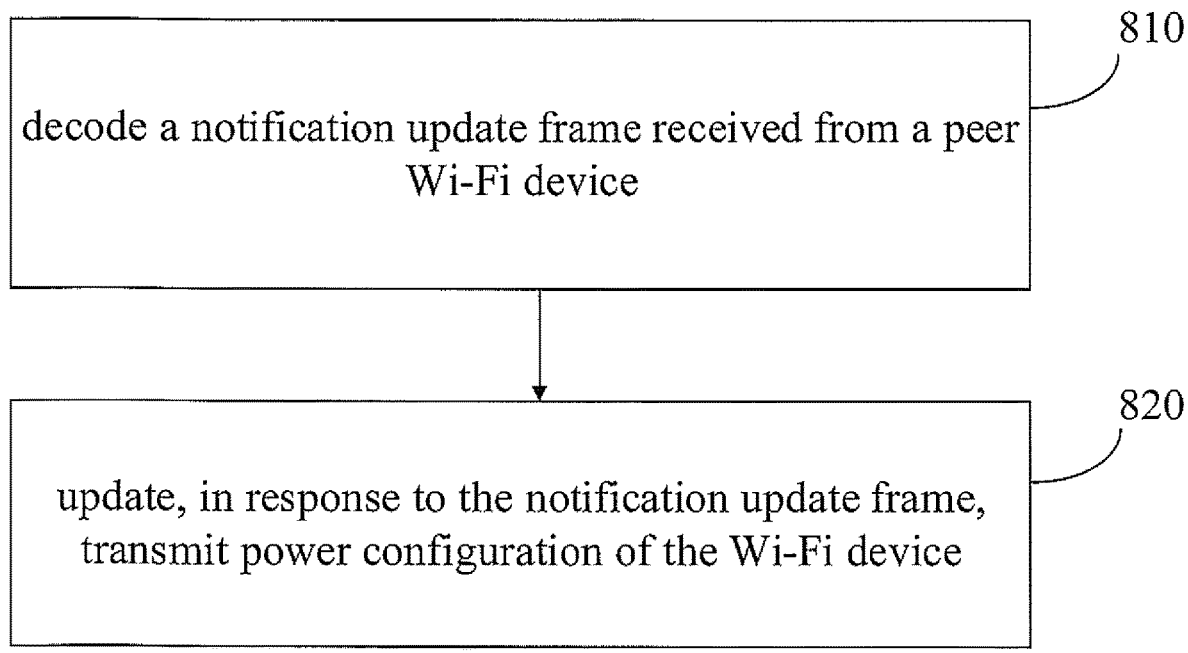
FIG. 8 illustrates a flowchart of a method for signaling operation information and transmit power information for an update procedure of device-to-device communication in accordance with one or more example embodiments of the present disclosure.

FIG. 8 illustrates a flowchart of a method 800 for signaling operation information and transmit power information for an update procedure of device-to-device communication in accordance with one or more example embodiments of the present disclosure. The method 800 may be performed by a Wi-Fi device, e.g., device A of FIG. 2 and FIG. 3.

At 810, a notification update frame received from a peer Wi-Fi device is decoded. The notification update frame may include an updated first Operation Information attribute of the peer Wi-Fi device to indicate a maximum transmit power of the peer Wi-Fi device and an updated first TPE element to indicate an updated first transmit power level of the peer Wi-Fi device.

At 820, in response to the notification update frame, transmit power configuration of the Wi-Fi device is updated.

In some embodiments where the Wi-Fi device and the peer Wi-Fi device are operable with Wi-Fi Direct technology, the notification update frame may include an Operation Notification frame; or the notification update frame may include a Beacon frame when the peer Wi-Fi device operates as a Group Owner.

In some embodiments where the Wi-Fi device and the peer Wi-Fi device are operable with Wi-Fi Aware technology, the notification update frame includes a Schedule Update Notification frame or an Operation Notification frame.

Figure 9:
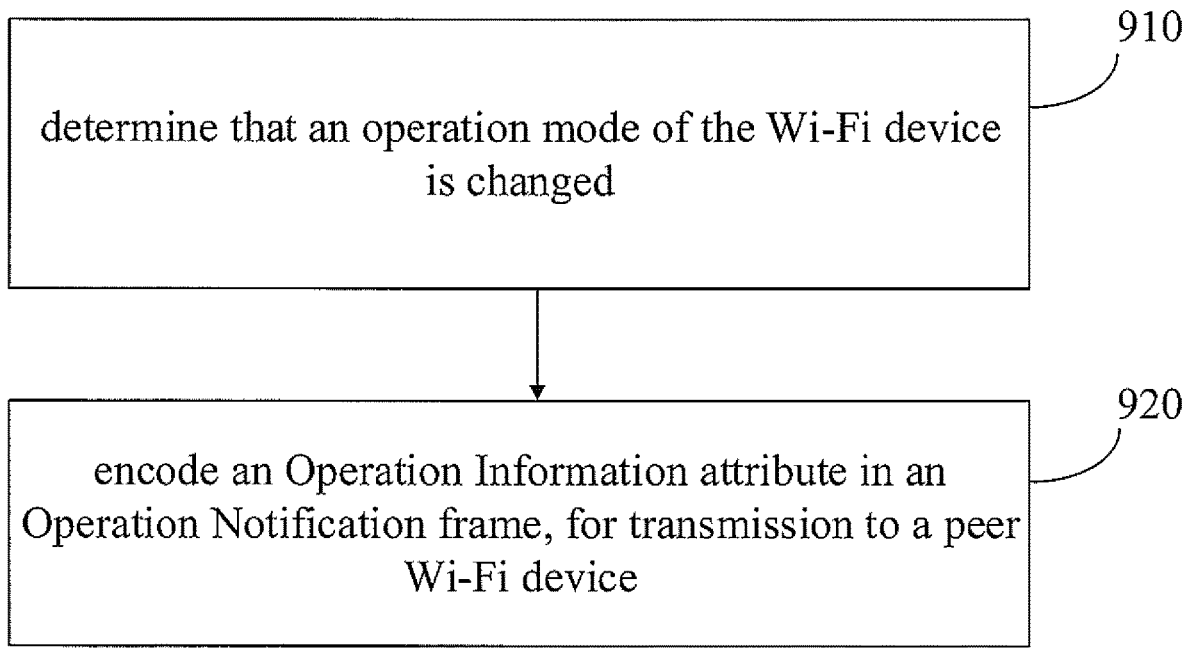
FIG. 9 illustrates a flowchart of a method for signaling operation information and transmit power information for an update procedure of device-to-device communication in accordance with one or more example embodiments of the present disclosure.

The method 800 in FIG. 8 is described from a perspective of device A, for example. FIG. 9 below will describe a method from a perspective of device B, for example. FIG. 9 illustrates a flowchart of a method 900 for signaling operation information and transmit power information for an update procedure of device-to-device communication in accordance with one or more example embodiments of the present disclosure. The method 900 may be performed by a Wi-Fi device, e.g., device B of FIG. 2 and FIG. 3.

At 910, it is determined that an operation mode of the Wi-Fi device is changed.

At 920, an Operation Information attribute is encoded in an Operation Notification frame, for transmission to a peer Wi-Fi device. The Operation Information attribute is to indicate the changed operation mode of the Wi-Fi device.

The operation mode described in some embodiments of the present disclosure is operable in in all IEEE 802.11 country elements and operating classes (Ref 802.11 Annex E).

The operation mode described in some embodiments of the present disclosure includes all device class/categories, form factors or other regulatory modes as specified in the Wi-Fi or non-Wi-Fi protocol.

The regulatory mode described in some embodiments of the present disclosure includes SP mode, LPI mode, VLP mode, VLP On-body mode, or any other regulatory information.

The disclosure provides a dynamic capability information notification mechanism to allow a peer device to notify its peer about its operation information (e.g., device class, form factor, or regulatory information), and/or transmit power promptly. The promptly communicating device's capability information to the peer device not only ensures compliance but also improves the performance of device-to-device communication.

The disclosure also provides a solution for a device to explicitly signal transmit power limit to the peer device. Including explicit Transmit Power level in the Notification allows forward compatibility. For example, in the future, if there is a new operation mode (e.g., new regulatory type, class attribute or form factor or the like) is defined, the legacy device may not understand the new operation mode, but the legacy device can still understand the transmit power level parameter The proposed mechanism is generic to all device-to-device communications, which can be utilized by Wi-Fi Direct, Wi-Fi Aware, or other technology. In some embodiments of the disclosure, the Wi-Fi device may include, but not limited to, a wireless access point (AP), a base station, a mobile device, or the like. The present disclosure is not limited in this respect.

Figure 10:
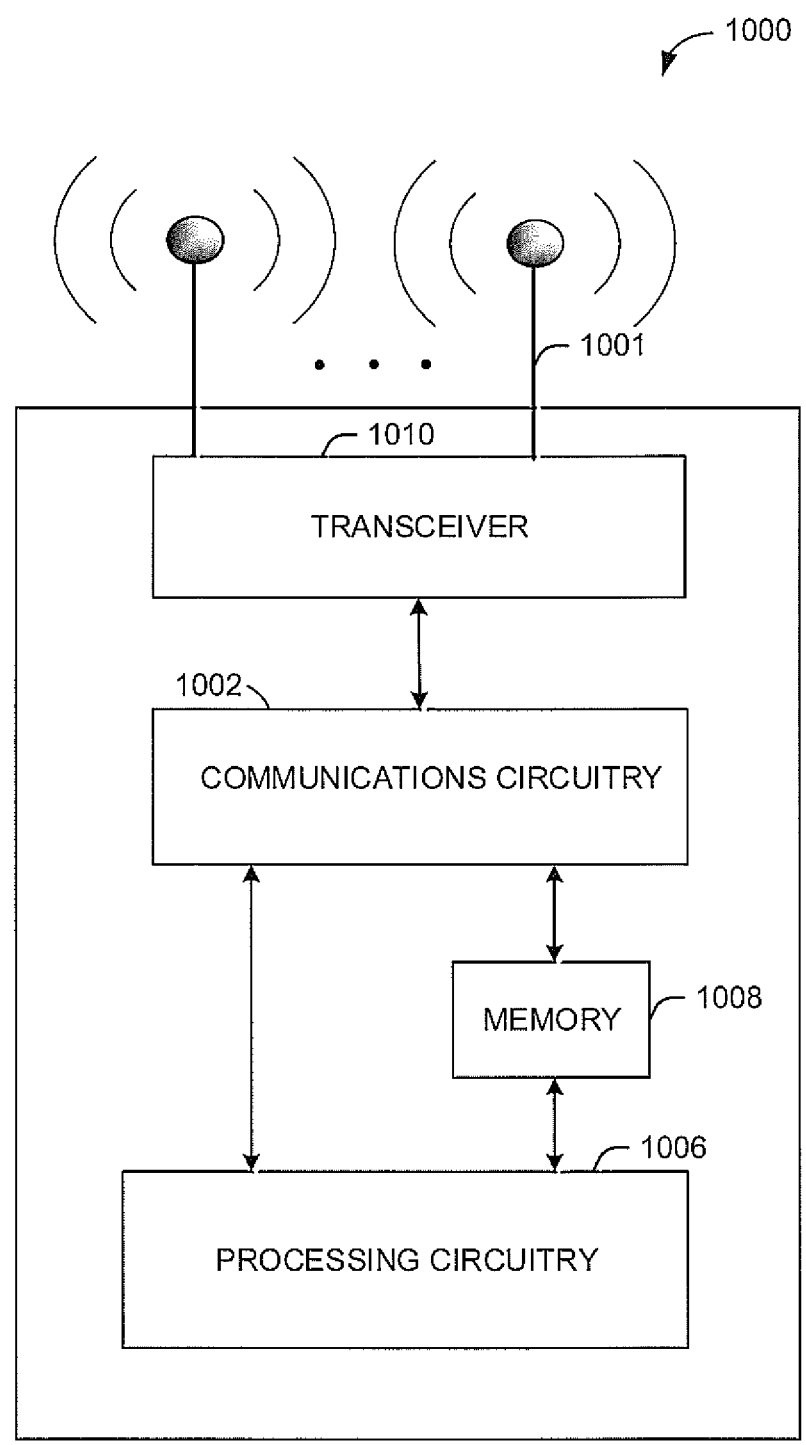
FIG. 10 illustrates a functional diagram of an exemplary communication station that may be suitable for use as a user device, in accordance with one or more example embodiments of the present disclosure.

FIG. 10 shows a functional diagram of an exemplary communication station 1000, in accordance with one or more example embodiments of the present disclosure. In one embodiment, FIG. 10 illustrates a functional block diagram of a communication station that may be suitable for use as a Wi-Fi device in accordance with some embodiments. The communication station 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device.

Figure 11:
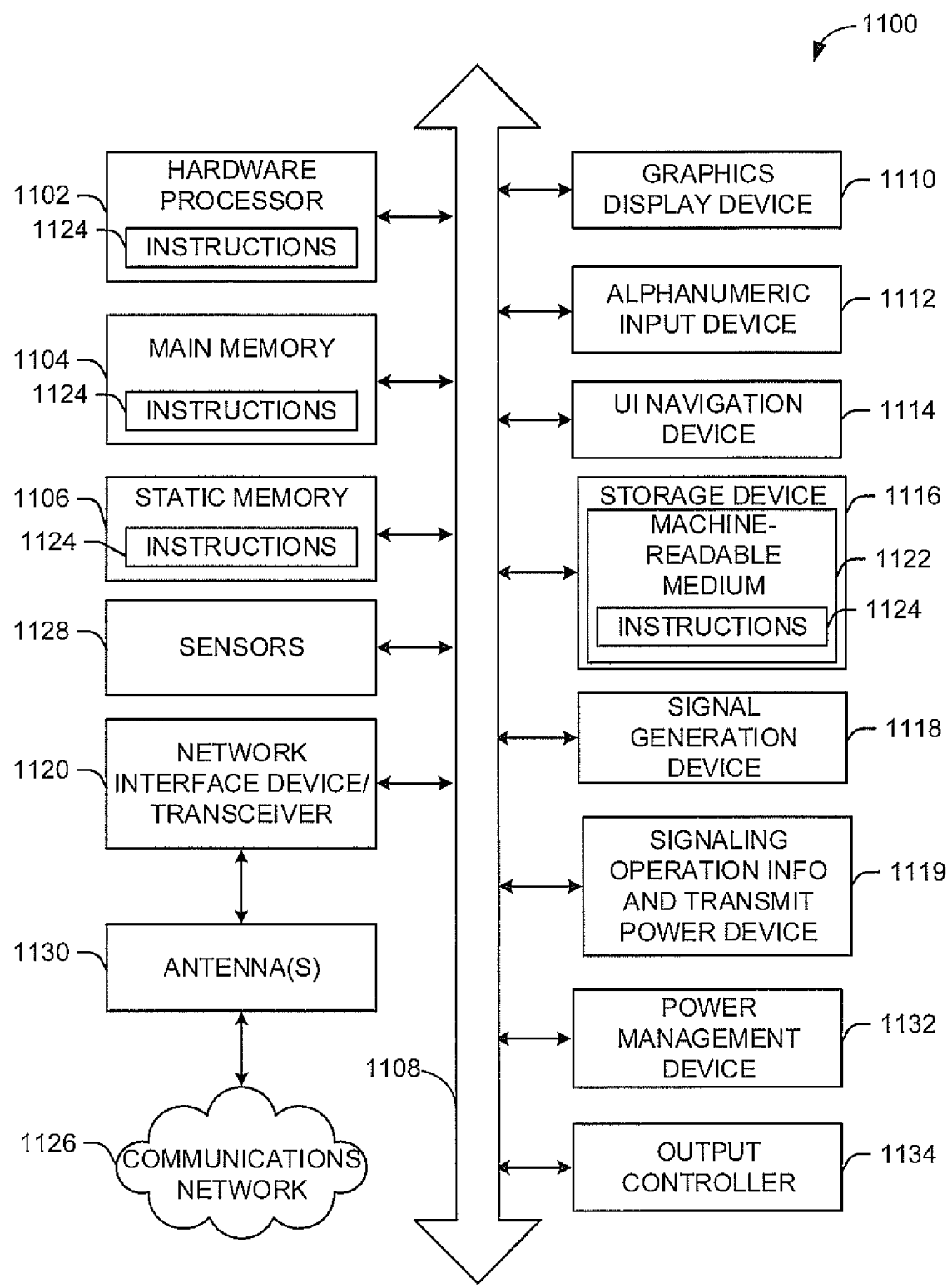
FIG. 11 illustrates a block diagram of an example machine upon which any of one or more techniques (e.g., methods) may be performed, in accordance with one or more example embodiments of the present disclosure.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (e.g., drive unit) 1116, a signal generation device 1118 (e.g., a speaker), a signaling operation info and transmit power device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the signaling operation info and transmit power device 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The signaling operation info and transmit power device 1119 may carry out or perform any of the operations and processes (e.g., processes 400, 500, 600, 700, 800 and 900) described and shown above.

It is understood that the above are only a subset of what the signaling operation info and transmit power device 1119 may be configured to perform and that other functions included throughout this disclosure may also be performed by the signaling operation info and transmit power device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
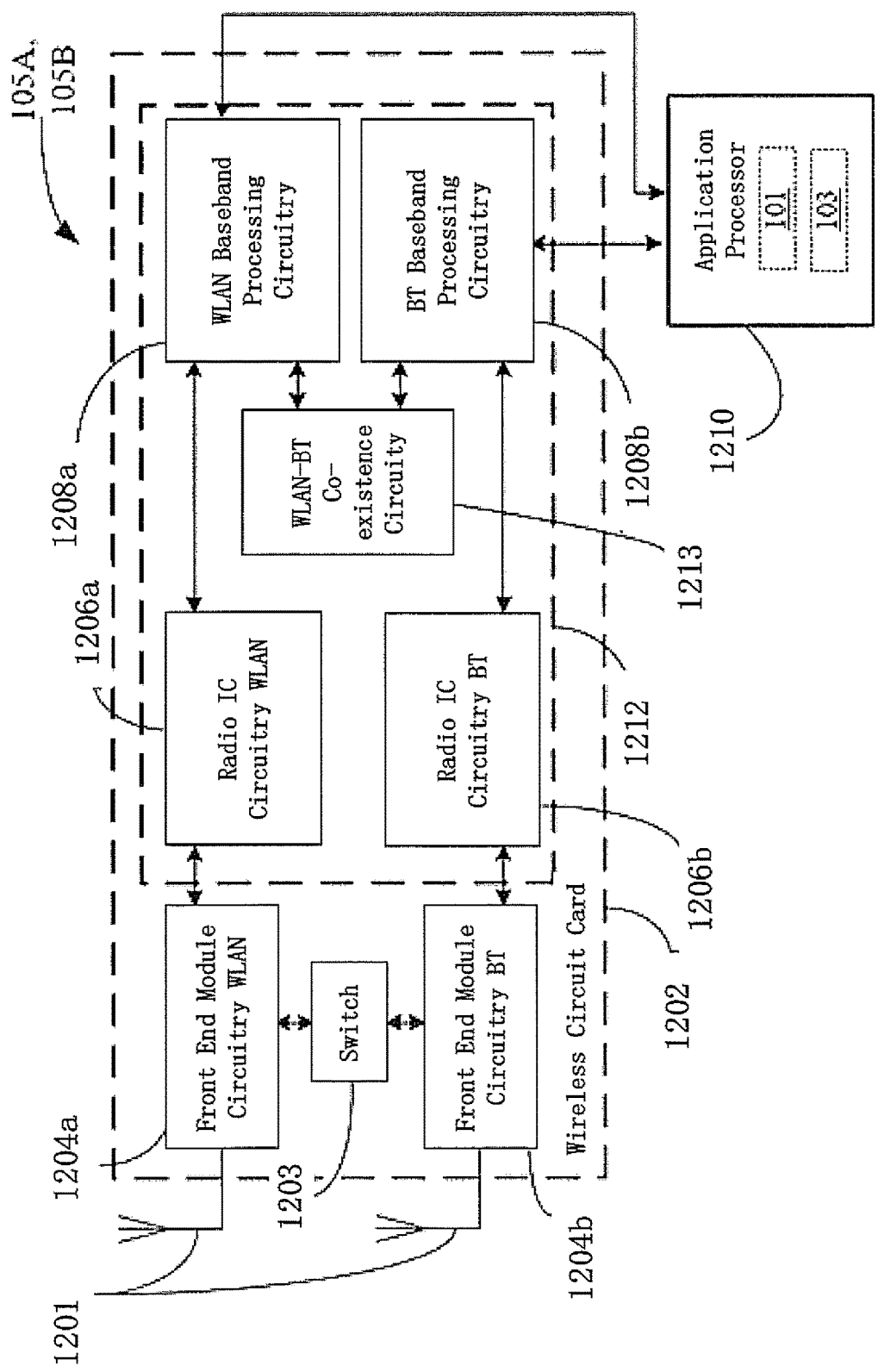
FIG. 12 is a block diagram of a radio architecture in accordance with some examples.

FIG. 12 is a block diagram of a radio architecture 105A, 105B in accordance with some embodiments that may be implemented in any Wi-Fi device described above. Radio architecture 105A, 105B may include radio front-end module (FEM) circuitry 1204a-b, radio IC circuitry 1206a-b and baseband processing circuitry 1208a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 1204b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204b and provide baseband signals to BT baseband processing circuitry 1208b. WLAN radio IC circuitry 1206a may also include a transmit signal path which may include circuitry to up-convert WLAN baseband signals provided by the WLAN baseband processing circuitry 1208a and provide WLAN RF output signals to the FEM circuitry 1204a for subsequent wireless transmission by the one or more antennas 1201. BT radio IC circuitry 1206b may also include a transmit signal path which may include circuitry to up-convert BT baseband signals provided by the BT baseband processing circuitry 1208b and provide BT RF output signals to the FEM circuitry 1204b for subsequent wireless transmission by the one or more antennas 1201. In the embodiment of FIG. 12, although radio IC circuitries 1206a and 1206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208a-b may include a WLAN baseband processing circuitry 1208a and a BT baseband processing circuitry 1208b. The WLAN baseband processing circuitry 1208a may include a memory, such as, for example, a set of RAM arrays in a Fast Fourier Transform or Inverse Fast Fourier Transform block (not shown) of the WLAN baseband processing circuitry 1208a. Each of the WLAN baseband circuitry 1208a and the BT baseband circuitry 1208b may further include one or more processors and control logic to process the signals received from the corresponding WLAN or BT receive signal path of the radio IC circuitry 1206a-b, and to also generate corresponding WLAN or BT baseband signals for the transmit signal path of the radio IC circuitry 1206a-b. Each of the baseband processing circuitries 1208a and 1208b may further include physical layer (PHY) and medium access control layer (MAC) circuitry, and may further interface with a device for generation and processing of the baseband signals and for controlling operations of the radio IC circuitry 1206a-b.

Referring still to FIG. 12, according to the shown embodiment, WLAN-BT coexistence circuitry 1213 may include logic providing an interface between the WLAN baseband circuitry 1208a and the BT baseband circuitry 1208b to enable use cases requiring WLAN and BT coexistence. In addition, a switch 1203 may be provided between the WLAN FEM circuitry 1204a and the BT FEM circuitry 1204b to allow switching between the WLAN and BT radios according to application needs. In addition, although the antennas 1201 are depicted as being respectively connected to the WLAN FEM circuitry 1204a and the BT FEM circuitry 1204b, embodiments include within their scope the sharing of one or more antennas as between the WLAN and BT FEMs, or the provision of more than one antenna connected to each of FEM 1204a or 1204b.

In some embodiments, the front-end module circuitry 1204a-b, the radio IC circuitry 1206a-b, and baseband processing circuitry 1208a-b may be provided on a single radio card, such as wireless radio card 1202. In some other embodiments, the one or more antennas 1201, the FEM circuitry 1204a-b and the radio IC circuitry 1206a-b may be provided on a single radio card. In some other embodiments, the radio IC circuitry 1206a-b and the baseband processing circuitry 1208a-b may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1208b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
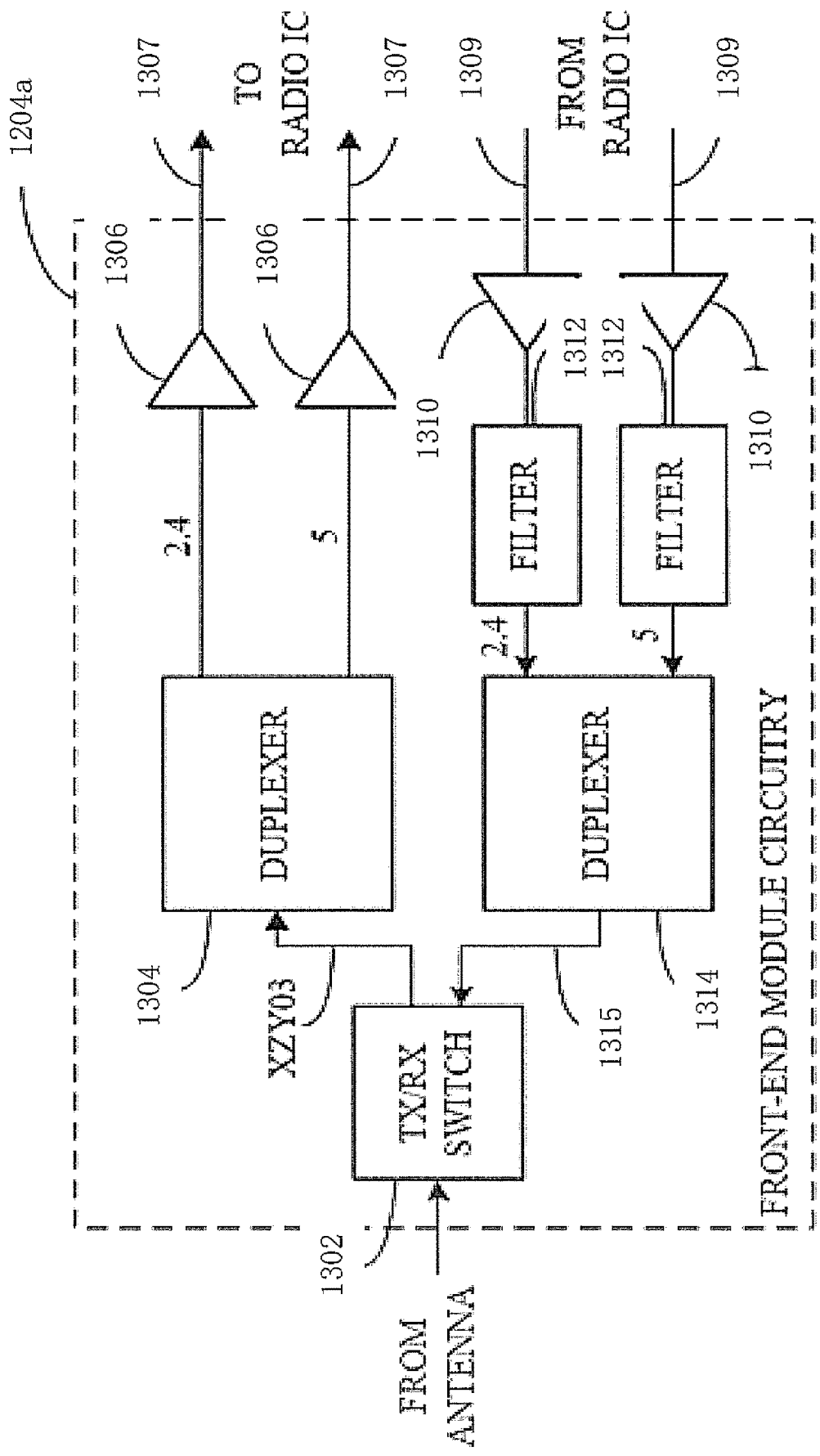
FIG. 13 illustrates an example front-end module circuitry for use in the radio architecture of FIG. 12, in accordance with one or more example embodiments of the present disclosure.

FIG. 13 illustrates WLAN FEM circuitry 1204a in accordance with some embodiments. Although the example of FIG. 13 is described in conjunction with the WLAN FEM circuitry 1204a, the example of FIG. 13 may be described in conjunction with the example BT FEM circuitry 1204b (FIG. 12), although other circuitry configurations may also be suitable.

In some embodiments, the FEM circuitry 1204a may include a TX/RX switch 1302 to switch between transmit mode and receive mode operation. The FEM circuitry 1204a may include a receive signal path and a transmit signal path. The receive signal path of the FEM circuitry 1204a may include a low-noise amplifier (LNA) 1306 to amplify received RF signals 1303 and provide the amplified received RF signals 1307 as an output (e.g., to the radio IC circuitry 1206a-b (FIG. 12)). The transmit signal path of the circuitry 1204a may include a power amplifier (PA) to amplify input RF signals 1309 (e.g., provided by the radio IC circuitry 1206a-b), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204a may be configured to operate in either the 2.4 GHz frequency spectrum or the 5 GHz frequency spectrum. In these embodiments, the receive signal path of the FEM circuitry 1204a may include a receive signal path duplexer 1304 to separate the signals from each spectrum as well as provide a separate LNA 1306 for each spectrum as shown. In these embodiments, the transmit signal path of the FEM circuitry 1204a may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204a as the one used for WLAN communications.

Figure 14:
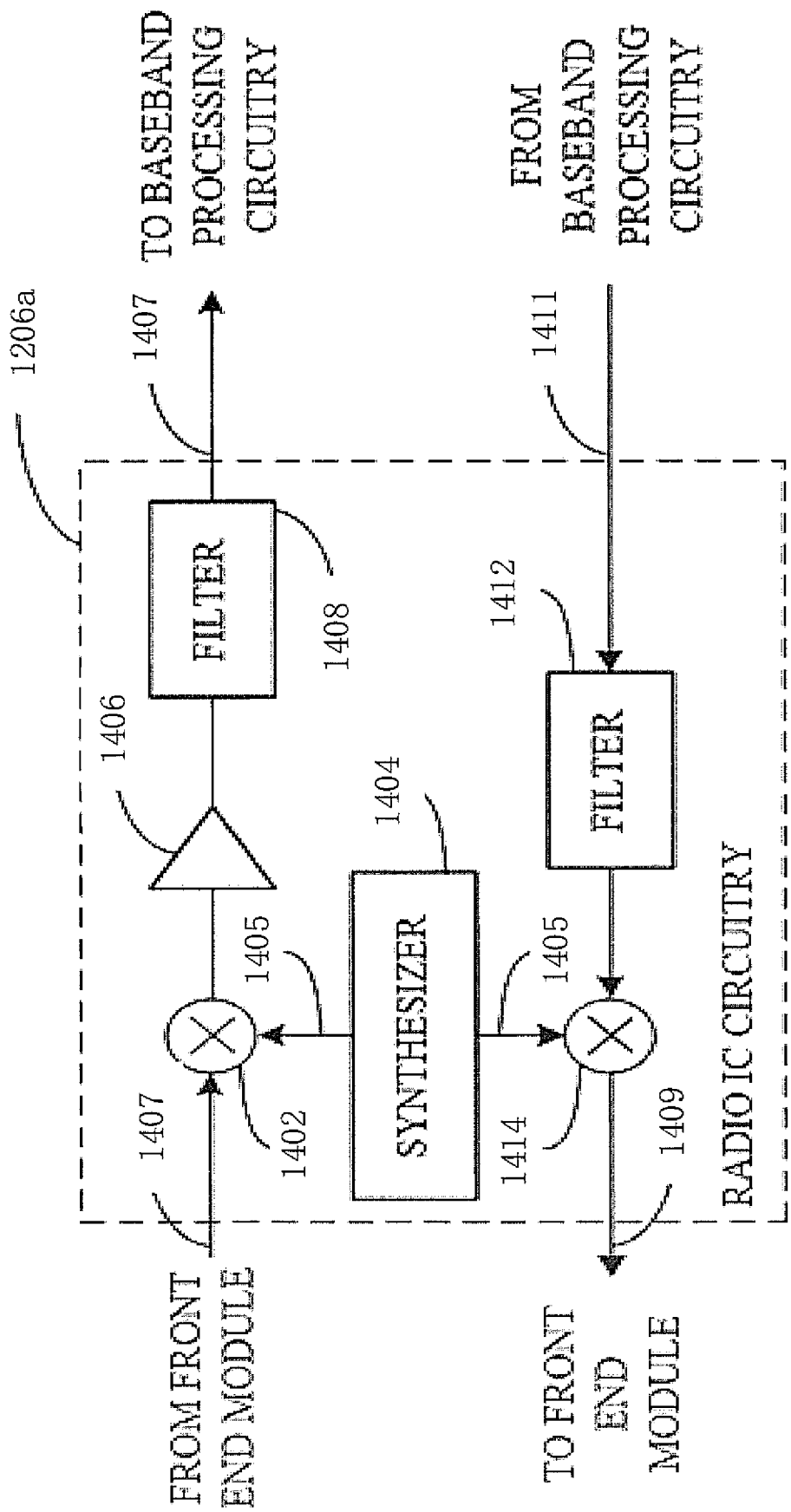
FIG. 14 illustrates an example radio IC circuitry for use in the radio architecture of FIG. 12, in accordance with one or more example embodiments of the present disclosure.

FIG. 14 illustrates radio IC circuitry 1206a in accordance with some embodiments. The radio IC circuitry 1206a is one example of circuitry that may be suitable for use as the WLAN or BT radio IC circuitry 1206a/1206b (FIG. 12), although other circuitry configurations may also be suitable. Alternatively, the example of FIG. 14 may be described in conjunction with the example BT radio IC circuitry 1206b.

In some embodiments, the radio IC circuitry 1206a may include a receive signal path and a transmit signal path. The receive signal path of the radio IC circuitry 1206a may include at least mixer circuitry 1402, such as, for example, down-conversion mixer circuitry, amplifier circuitry 1406 and filter circuitry 1408. The transmit signal path of the radio IC circuitry 1206a may include at least filter circuitry 1412 and mixer circuitry 1414, such as, for example, up-conversion mixer circuitry. Radio IC circuitry 1206a may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1307 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1309 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or up-conversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct up-conversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1307 from FIG. 14 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1404 may be provided by a voltage controlled oscillator (VCO), although that is not a requirement. A divider control input may further be provided by either the baseband processing circuitry 1208*a-b* (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210. The application processor 1210 may include, or otherwise be connected to, one of the example secure signal converter 101 or the example received signal converter 103 (e.g., depending on which device the example radio architecture is implemented in).

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency (fLO).

Figure 15:
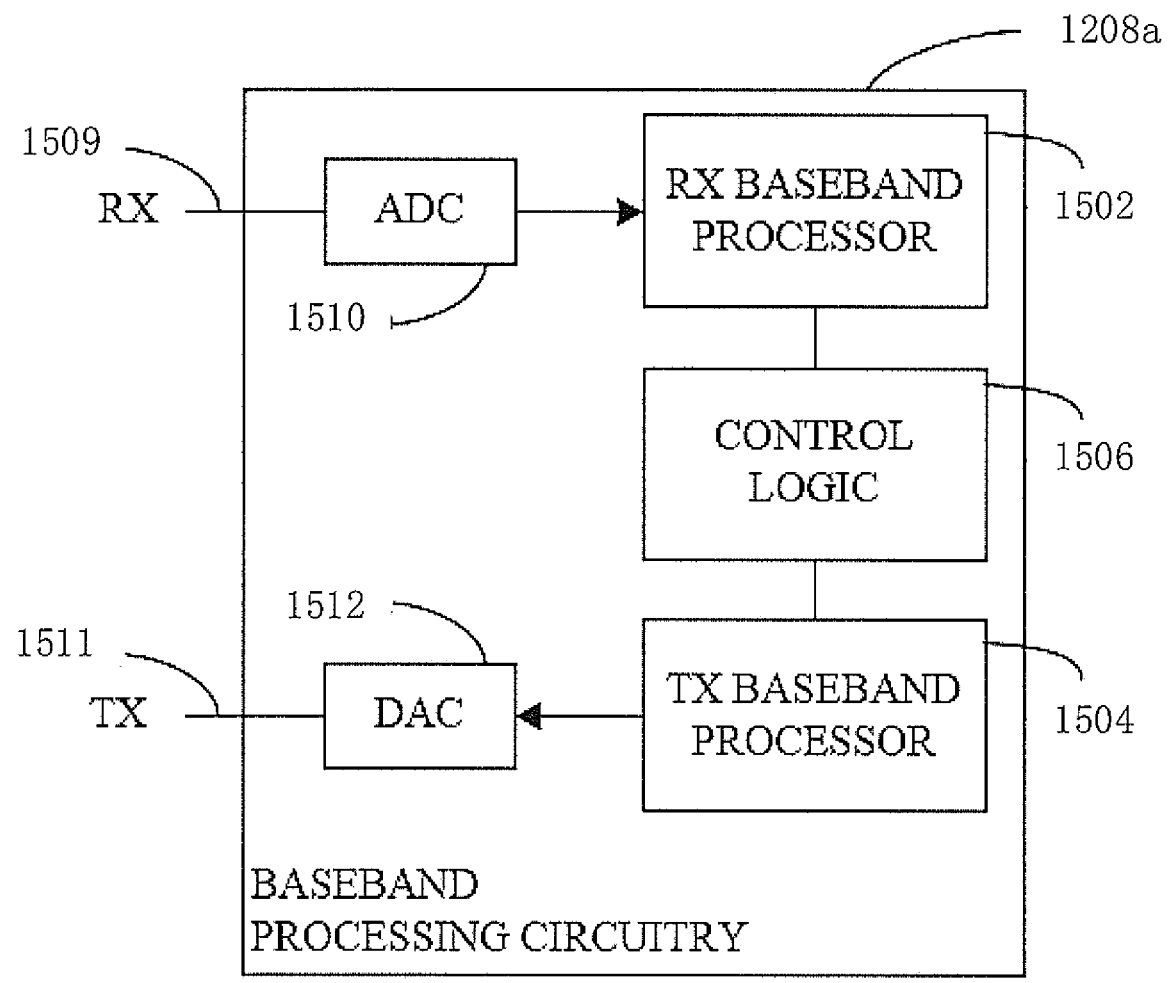
FIG. 15 illustrates an example baseband processing circuitry for use in the radio architecture of FIG. 12, in accordance with one or more example embodiments of the present disclosure.

FIG. 15 illustrates a functional block diagram of baseband processing circuitry 1208*a* in accordance with some embodiments. The baseband processing circuitry 1208*a* is one example of circuitry that may be suitable for use as the baseband processing circuitry 1208*a* (FIG. 12), although other circuitry configurations may also be suitable. Alternatively, the example of FIG. 14 may be used to implement the example BT baseband processing circuitry 1208*b* of FIG. 12.

The baseband processing circuitry 1208*a* may include a receive baseband processor (RX BBP) 1502 for processing receive baseband signals 1409 provided by the radio IC circuitry 1206*a-b* (FIG. 12) and a transmit baseband processor (TX BBP) 1504 for generating transmit baseband signals 1411 for the radio IC circuitry 1206*a-b*. The baseband processing circuitry 1208*a* may also include control logic 1506 for coordinating the operations of the baseband processing circuitry 1208*a*.

In some embodiments (e.g., when analog baseband signals are exchanged between the baseband processing circuitry 1208*a-b* and the radio IC circuitry 1206*a-b*), the baseband processing circuitry 1208*a* may include ADC 1510 to convert analog baseband signals 1509 received from the radio IC circuitry 1206*a-b* to digital baseband signals for processing by the RX BBP 1502. In these embodiments, the baseband processing circuitry 1208*a* may also include DAC 1512 to convert digital baseband signals from the TX BBP 1504 to analog baseband signals 1511.

In some embodiments that communicate OFDM signals or OFDMA signals, such as through baseband processor 1208*a*, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following paragraphs describe examples of various embodiments.

Example 1 includes an apparatus for a Wireless Fidelity (Wi-Fi) device, the apparatus comprising: a Radio Frequency (RF) interface; and processor circuitry coupled with the RF interface, wherein the processor circuitry is to: decode a first discovery frame received from a peer Wi-Fi device via the RF interface to obtain a first Operation Information attribute of the peer Wi-Fi device, wherein the first Operation Information attribute is to indicate a first operation mode of the peer Wi-Fi device; and encode, in response to the first discovery frame, a second discovery frame for transmission to the peer Wi-Fi device via the RF interface, wherein the second discovery frame includes a second Operation Information attribute of the Wi-Fi device to indicate a second operation mode of the Wi-Fi device.

Example 2 includes the apparatus of Example 1, wherein: the first discovery frame includes a Probe Request frame, and the second discovery frame includes a Probe Response frame; or the first discovery frame includes a first Beacon frame, and the second discovery frame includes a second Beacon frame.

Example 3 includes the apparatus of Example 2, wherein the Wi-Fi device and the peer Wi-Fi device are operable with Wi-Fi Direct technology.

Example 4 includes the apparatus of Example 1, wherein the first discovery frame includes a first Neighbor Awareness Networking (NAN) Discovery frame, and the second discovery frame includes a second NAN Discovery frame.

Example 5 includes the apparatus of Example 4, wherein the Wi-Fi device and the peer Wi-Fi device are operable with Wi-Fi Aware technology.

Example 6 includes the apparatus of Example 1, wherein the first operation mode and the second operation mode are operable in an Institute of Electrical and Electronics Engineers (IEEE) country element and an operating class.

Example 7 includes the apparatus of Example 6, wherein each of the first operation mode and the second operation mode includes a device class/category, a form factor or a regulatory mode as specified in a Wi-Fi protocol or a non-Wi-Fi protocol.

Example 7a includes the apparatus of Example 7, wherein the regulatory mode includes a Standard Power (SP) mode, a Low Power Indoor (LPI) mode, a Very Low Power (VLP) mode, or a VLP On-body mode.

Example 8 includes an apparatus for a Wireless Fidelity (Wi-Fi) device, the apparatus comprising: a Radio Frequency (RF) interface; and processor circuitry coupled with the RF interface, wherein the processor circuitry is to: decode a first operation setup frame received from a peer Wi-Fi device via the RF interface, wherein the first operation setup frame includes a first Operation Information attribute of the peer Wi-Fi device to indicate a first operation mode of the peer Wi-Fi device; and encode, in response to the first operation setup frame, a second operation setup frame for transmission to the peer Wi-Fi device via the RF interface, wherein the second operation setup frame includes a second Operation Information attribute of the Wi-Fi device to indicate a second operation mode of the Wi-Fi device.

Example 9 includes the apparatus of Example 8, wherein the first operation setup frame further includes an explicit first Transmit Power Envelop (TPE) element to indicate a first transmit power level of the peer Wi-Fi device, and the second operation setup frame further includes an explicit second TPE element to indicate a second transmit power level of the Wi-Fi device.

Example 10 includes the apparatus of Example 8, wherein the first operation setup frame includes a Provision Discovery Request frame, and the second operation setup frame includes a Provision Discovery Response frame.

Example 11 includes the apparatus of Example 10, wherein the Wi-Fi device and the peer Wi-Fi device are operable with Wi-Fi Direct technology.

Example 12 includes the apparatus of Example 8, wherein: the first operation setup frame includes a first Data Path Request frame, and the second operation setup frame includes a second Data Path Response frame; the first operation setup frame includes a first Ranging Request frame, and the second operation setup frame includes a second Ranging Response frame; or the first operation setup frame includes a first Schedule Request frame, and the second operation setup frame includes a second Schedule Response frame.

Example 13 includes the apparatus of Example 12, wherein the Wi-Fi device and the peer Wi-Fi device are operable with Wi-Fi Aware technology.

Example 14 includes the apparatus of Example 8, wherein the first operation setup frame further includes a first Country element to indicate regulatory domain information of the peer Wi-Fi device, and the second operation setup frame further includes a second Country element to indicate regulatory domain information of the Wi-Fi device.

Example 15 includes an apparatus for a Wireless Fidelity (Wi-Fi) device, the apparatus comprising: a Radio Frequency (RF) interface; and processor circuitry coupled with the RF interface, wherein the processor circuitry is to: decode a notification update frame received from a peer Wi-Fi device via the RF interface, wherein the notification update frame includes an updated first Operation Information attribute of the peer Wi-Fi device to indicate a maximum transmit power of the peer Wi-Fi device and an updated first Transmit Power Envelop (TPE) element to indicate an updated first transmit power level of the peer Wi-Fi device; and update, in response to the notification update frame, transmit power configuration of the Wi-Fi device.

Example 16 includes the apparatus of Example 15, wherein: the notification update frame includes an Operation Notification frame; or the notification update frame includes a Beacon frame when the peer Wi-Fi device operates as a Group Owner.

Example 17 includes the apparatus of Example 16, wherein the Wi-Fi device and the peer Wi-Fi device are operable with Wi-Fi Direct technology.

Example 18 includes the apparatus of Example 15, wherein the notification update frame includes a Schedule Update Notification frame or an Operation Notification frame.

Example 19 includes the apparatus of Example 18, wherein the Wi-Fi device and the peer Wi-Fi device are operable with Wi-Fi Aware technology.

Example 20 includes an apparatus for a Wireless Fidelity (Wi-Fi) device, the apparatus comprising: a Radio Frequency (RF) interface; and processor circuitry coupled with the RF interface, wherein the processor circuitry is to: encode a first operation setup frame for transmission to a peer Wi-Fi device via the RF interface, wherein the first operation setup frame includes a first Operation Information attribute to indicate a first operation mode of the Wi-Fi device and a first Transmit Power Envelop (TPE) element of the Wi-Fi device to indicate a first transmit power level of the Wi-Fi device; and decode, in response to the first operation setup frame, a second operation setup frame received from the peer Wi-Fi device via the RF interface, wherein the second operation setup frame includes a second Operation Information attribute to indicate a second operation mode of the peer Wi-Fi device and a second TPE element to indicate a second transmit power level of the peer Wi-Fi device.

Example 21 includes the apparatus of Example 20, wherein: the first operation setup frame includes a Provision Discovery Request frame, and the second operation setup frame includes a Provision Discovery Response frame; the first operation setup frame includes a first Data Path Request frame, and the second operation setup frame includes a second Data Path Response frame; the first operation setup frame includes a first Ranging Request frame, and the second operation setup frame includes a second Ranging Response frame; or the first operation setup frame includes a first Schedule Request frame, and the second operation setup frame includes a second Schedule Response frame.

Example 22 includes an apparatus for a Wireless Fidelity (Wi-Fi) device, the apparatus comprising: a Radio Frequency (RF) interface; and processor circuitry coupled with the RF interface, wherein the processor circuitry is to: determine that an operation mode of the Wi-Fi device is changed; and encode an Operation Information attribute in an Operation Notification frame, for transmission to a peer Wi-Fi device via the RF interface, wherein the Operation Information attribute is to indicate the changed operation mode of the Wi-Fi device.

Example 23 includes the apparatus of Example 22, wherein the processor circuitry is to: determine that a transmit power level of the Wi-Fi device is changed; and encode a Transmit Power Envelop (TPE) element in the Operation Notification frame to indicate the changed transmit power level of the Wi-Fi device.

Example 24 includes the apparatus of Example 22, wherein the Operation Notification frame further includes a Country element of the Wi-Fi device to indicate regulatory domain information of the Wi-Fi device.

Example 25 includes the apparatus of Example 22, wherein the operation mode is operable in an Institute of Electrical and Electronics Engineers (IEEE) country element and an operating class.

Example 26 includes an apparatus for a Wireless Fidelity (Wi-Fi) device, the apparatus comprising: a Radio Frequency (RF) interface; and processor circuitry coupled with the RF interface, wherein the processor circuitry is to: encode a first discovery frame for transmission to a peer Wi-Fi device via the RF interface, wherein the first discovery frame includes a first Operation Information attribute to indicate a first operation mode of the Wi-Fi device; and decode, in response to the first discovery frame, a second discovery frame received from the peer Wi-Fi device via the RF interface, wherein the second discovery frame includes a second Operation Information attribute to indicate a second operation mode of the peer Wi-Fi device.

Example 27 includes the apparatus of Example 26, wherein: the first discovery frame includes a Probe Request frame, and the second discovery frame includes a Probe Response frame; or the first discovery frame includes a first Beacon frame, and the second discovery frame includes a second Beacon frame.

Example 28 includes the apparatus of Example 27, wherein the Wi-Fi device and the peer Wi-Fi device are operable with Wi-Fi Direct technology.

Example 29 includes the apparatus of Example 26, wherein the first discovery frame includes a first Neighbor Awareness Networking (NAN) Discovery frame, and the second discovery frame includes a second NAN Discovery frame.

Example 30 includes the apparatus of Example 29, wherein the Wi-Fi device and the peer Wi-Fi device are operable with Wi-Fi Aware technology.

Example 31 includes the apparatus of Example 26, wherein the first operation mode and the second operation mode are operable in an Institute of Electrical and Electronics Engineers (IEEE) country element and an operating class.

Example 32 includes the apparatus of Example 26, wherein each of the first operation mode and the second operation mode includes a device class/category, a form factor or a regulatory mode as specified in a Wi-Fi protocol or a non-Wi-Fi protocol.

Example 32a includes the apparatus of Example 32, wherein the regulatory mode includes a Standard Power (SP) mode, a Low Power Indoor (LPI) mode, a Very Low Power (VLP) mode, or a VLP On-body mode.

Example 33 includes an apparatus for a Wireless Fidelity (Wi-Fi) device, the apparatus comprising: means for decoding a first discovery frame received from a peer Wi-Fi device to obtain a first Operation Information attribute of the peer Wi-Fi device, wherein the first Operation Information attribute is to indicate a first operation mode of the peer Wi-Fi device; and means for encoding, in response to the first discovery frame, a second discovery frame for transmission to the peer Wi-Fi device, wherein the second discovery frame includes a second Operation Information attribute of the Wi-Fi device to indicate a second operation mode of the Wi-Fi device.

Example 34 includes the apparatus of Example 33, wherein: the first discovery frame includes a Probe Request frame, and the second discovery frame includes a Probe Response frame; or the first discovery frame includes a first Beacon frame, and the second discovery frame includes a second Beacon frame.

Example 35 includes the apparatus of Example 34, wherein the Wi-Fi device and the peer Wi-Fi device are operable with Wi-Fi Direct technology.

Example 36 includes the apparatus of Example 33, wherein the first discovery frame includes a first Neighbor Awareness Networking (NAN) Discovery frame, and the second discovery frame includes a second NAN Discovery frame.

Example 37 includes the apparatus of Example 36, wherein the Wi-Fi device and the peer Wi-Fi device are operable with Wi-Fi Aware technology.

Example 38 includes the apparatus of Example 33, wherein the first operation mode and the second operation mode are operable in an Institute of Electrical and Electronics Engineers (IEEE) country element and an operating class.

Example 39 includes the apparatus of Example 38, wherein each of the first operation mode and the second operation mode includes a device class/category, a form factor or a regulatory mode as specified in a Wi-Fi protocol or a non-Wi-Fi protocol.

Example 39a includes the apparatus of Example 39, wherein the regulatory mode includes a Standard Power (SP) mode, a Low Power Indoor (LPI) mode, a Very Low Power (VLP) mode, or a VLP On-body mode.

Example 40 includes an apparatus for a Wireless Fidelity (Wi-Fi) device, the apparatus comprising: means for decoding a first operation setup frame received from a peer Wi-Fi device, wherein the first operation setup frame includes a first Operation Information attribute of the peer Wi-Fi device to indicate a first operation mode of the peer Wi-Fi device; and means for encoding, in response to the first operation setup frame, a second operation setup frame for transmission to the peer Wi-Fi device, wherein the second operation setup frame includes a second Operation Information attribute of the Wi-Fi device to indicate a second operation mode of the Wi-Fi device.

Example 41 includes the apparatus of Example 40, wherein the first operation setup frame further includes an explicit first Transmit Power Envelop (TPE) element to indicate a first transmit power level of the peer Wi-Fi device, and the second operation setup frame further includes an explicit second TPE element to indicate a second transmit power level of the Wi-Fi device.

Example 42 includes the apparatus of Example 40, wherein the first operation setup frame includes a Provision Discovery Request frame, and the second operation setup frame includes a Provision Discovery Response frame.

Example 43 includes the apparatus of Example 42, wherein the Wi-Fi device and the peer Wi-Fi device are operable with Wi-Fi Direct technology.

Example 44 includes the apparatus of Example 40, wherein: the first operation setup frame includes a first Data Path Request frame, and the second operation setup frame includes a second Data Path Response frame; the first operation setup frame includes a first Ranging Request frame, and the second operation setup frame includes a second Ranging Response frame; or the first operation setup frame includes a first Schedule Request frame, and the second operation setup frame includes a second Schedule Response frame.

Example 45 includes the apparatus of Example 44, wherein the Wi-Fi device and the peer Wi-Fi device are operable with Wi-Fi Aware technology.

Example 46 includes the apparatus of Example 40, wherein the first operation setup frame further includes a first Country element to indicate regulatory domain information of the peer Wi-Fi device, and the second operation setup frame further includes a second Country element to indicate regulatory domain information of the Wi-Fi device.

Example 47 includes an apparatus for a Wireless Fidelity (Wi-Fi) device, the apparatus comprising: means for decoding a notification update frame received from a peer Wi-Fi device, wherein the notification update frame includes an updated first Operation Information attribute of the peer Wi-Fi device to indicate a maximum transmit power of the peer Wi-Fi device and an updated first Transmit Power Envelop (TPE) element to indicate an updated first transmit power level of the peer Wi-Fi device; and means for updating, in response to the notification update frame, transmit power configuration of the Wi-Fi device.

Example 48 includes the apparatus of Example 47, wherein: the notification update frame includes an Operation Notification frame; or the notification update frame includes a Beacon frame when the peer Wi-Fi device operates as a Group Owner.

Example 49 includes the apparatus of Example 48, wherein the Wi-Fi device and the peer Wi-Fi device are operable with Wi-Fi Direct technology.

Example 50 includes the apparatus of Example 47, wherein the notification update frame includes a Schedule Update Notification frame or an Operation Notification frame.

Example 51 includes the apparatus of Example 50, wherein the Wi-Fi device and the peer Wi-Fi device are operable with Wi-Fi Aware technology.

Example 52 includes an apparatus for a Wireless Fidelity (Wi-Fi) device, the apparatus comprising: means for encoding a first operation setup frame for transmission to a peer Wi-Fi device, wherein the first operation setup frame includes a first Operation Information attribute to indicate a first operation mode of the Wi-Fi device and a first Transmit Power Envelop (TPE) element of the Wi-Fi device to indicate a first transmit power level of the Wi-Fi device; and means for decoding, in response to the first operation setup frame, a second operation setup frame received from the peer Wi-Fi device, wherein the second operation setup frame includes a second Operation Information attribute to indicate a second operation mode of the peer Wi-Fi device and a second TPE element to indicate a second transmit power level of the peer Wi-Fi device.

Example 53 includes the apparatus of Example 52, wherein: the first operation setup frame includes a Provision Discovery Request frame, and the second operation setup frame includes a Provision Discovery Response frame; the first operation setup frame includes a first Data Path Request frame, and the second operation setup frame includes a second Data Path Response frame; the first operation setup frame includes a first Ranging Request frame, and the second operation setup frame includes a second Ranging Response frame; or the first operation setup frame includes a first Schedule Request frame, and the second operation setup frame includes a second Schedule Response frame.

Example 54 includes an apparatus for a Wireless Fidelity (Wi-Fi) device, the apparatus comprising: means for determining that an operation mode of the Wi-Fi device is changed; and means for encoding an Operation Information attribute in an Operation Notification frame, for transmission to a peer Wi-Fi device, wherein the Operation Information attribute is to indicate the changed operation mode of the Wi-Fi device.

Example 55 includes the apparatus of Example 54, wherein the processor circuitry is to: means for determining that a transmit power level of the Wi-Fi device is changed; and means for encoding a Transmit Power Envelop (TPE) element in the Operation Notification frame to indicate the changed transmit power level of the Wi-Fi device.

Example 56 includes the apparatus of Example 54, wherein the Operation Notification frame further includes a Country element of the Wi-Fi device to indicate regulatory domain information of the Wi-Fi device.

Example 57 includes the apparatus of Example 54, wherein the operation mode is operable in an Institute of Electrical and Electronics Engineers (IEEE) country element and an operating class.

Example 58 includes an apparatus for a Wireless Fidelity (Wi-Fi) device, the apparatus comprising: means for encoding a first discovery frame for transmission to a peer Wi-Fi device, wherein the first discovery frame includes a first Operation Information attribute to indicate a first operation mode of the Wi-Fi device; and means for decoding, in response to the first discovery frame, a second discovery frame received from the peer Wi-Fi device, wherein the second discovery frame includes a second Operation Information attribute to indicate a second operation mode of the peer Wi-Fi device.

Example 59 includes the apparatus of Example 58, wherein: the first discovery frame includes a Probe Request frame, and the second discovery frame includes a Probe Response frame; or the first discovery frame includes a first Beacon frame, and the second discovery frame includes a second Beacon frame.

Example 60 includes the apparatus of Example 59, wherein the Wi-Fi device and the peer Wi-Fi device are operable with Wi-Fi Direct technology.

Example 61 includes the apparatus of Example 58, wherein the first discovery frame includes a first Neighbor Awareness Networking (NAN) Discovery frame, and the second discovery frame includes a second NAN Discovery frame.

Example 62 includes the apparatus of Example 61, wherein the Wi-Fi device and the peer Wi-Fi device are operable with Wi-Fi Aware technology.

Example 63 includes the apparatus of Example 58, wherein the first operation mode and the second operation mode are operable in an Institute of Electrical and Electronics Engineers (IEEE) country element and an operating class.

Example 64 includes the apparatus of Example 58, wherein each of the first operation mode and the second operation mode includes a device class/category, a form factor or a regulatory mode as specified in a Wi-Fi protocol or a non-Wi-Fi protocol.

Example 64a includes the apparatus of Example 64, wherein the regulatory mode includes a Standard Power (SP) mode, a Low Power Indoor (LPI) mode, a Very Low Power (VLP) mode, or a VLP On-body mode.

Example 65 includes a method for a Wireless Fidelity (Wi-Fi) device, the method comprising: decoding a first discovery frame received from a peer Wi-Fi device to obtain a first Operation Information attribute of the peer Wi-Fi device, wherein the first Operation Information attribute is to indicate a first operation mode of the peer Wi-Fi device; and encoding, in response to the first discovery frame, a second discovery frame for transmission to the peer Wi-Fi device, wherein the second discovery frame includes a second Operation Information attribute of the Wi-Fi device to indicate a second operation mode of the Wi-Fi device.

Example 66 includes the method of Example 65, wherein: the first discovery frame includes a Probe Request frame, and the second discovery frame includes a Probe Response frame; or the first discovery frame includes a first Beacon frame, and the second discovery frame includes a second Beacon frame.

Example 67 includes the method of Example 66, wherein the Wi-Fi device and the peer Wi-Fi device are operable with Wi-Fi Direct technology.

Example 68 includes the method of Example 65, wherein the first discovery frame includes a first Neighbor Awareness Networking (NAN) Discovery frame, and the second discovery frame includes a second NAN Discovery frame.

Example 69 includes the method of Example 68, wherein the Wi-Fi device and the peer Wi-Fi device are operable with Wi-Fi Aware technology.

Example 70 includes the method of Example 65, wherein the first operation mode and the second operation mode are operable in an Institute of Electrical and Electronics Engineers (IEEE) country element and an operating class.

Example 71 includes the method of Example 70, wherein each of the first operation mode and the second operation mode includes a device class/category, a form factor or a regulatory mode as specified in a Wi-Fi protocol or a non-Wi-Fi protocol.

Example 71a includes the method of Example 71, wherein the regulatory mode includes a Standard Power (SP) mode, a Low Power Indoor (LPI) mode, a Very Low Power (VLP) mode, or a VLP On-body mode.

Example 72 includes a method for a Wireless Fidelity (Wi-Fi) device, the method comprising: decoding a first operation setup frame received from a peer Wi-Fi device, wherein the first operation setup frame includes a first Operation Information attribute of the peer Wi-Fi device to indicate a first operation mode of the peer Wi-Fi device; and encoding, in response to the first operation setup frame, a second operation setup frame for transmission to the peer Wi-Fi device, wherein the second operation setup frame includes a second Operation Information attribute of the Wi-Fi device to indicate a second operation mode of the Wi-Fi device.

Example 73 includes the method of Example 72, wherein the first operation setup frame further includes an explicit first Transmit Power Envelop (TPE) element to indicate a first transmit power level of the peer Wi-Fi device, and the second operation setup frame further includes an explicit second TPE element to indicate a second transmit power level of the Wi-Fi device.

Example 74 includes the method of Example 72, wherein the first operation setup frame includes a Provision Discovery Request frame, and the second operation setup frame includes a Provision Discovery Response frame.

Example 75 includes the method of Example 74, wherein the Wi-Fi device and the peer Wi-Fi device are operable with Wi-Fi Direct technology.

Example 76 includes the method of Example 72, wherein: the first operation setup frame includes a first Data Path Request frame, and the second operation setup frame includes a second Data Path Response frame; the first operation setup frame includes a first Ranging Request frame, and the second operation setup frame includes a second Ranging Response frame; or the first operation setup frame includes a first Schedule Request frame, and the second operation setup frame includes a second Schedule Response frame.

Example 77 includes the method of Example 76, wherein the Wi-Fi device and the peer Wi-Fi device are operable with Wi-Fi Aware technology.

Example 78 includes the method of Example 72, wherein the first operation setup frame further includes a first Country element to indicate regulatory domain information of the peer Wi-Fi device, and the second operation setup frame further includes a second Country element to indicate regulatory domain information of the Wi-Fi device.

Example 79 includes a method for a Wireless Fidelity (Wi-Fi) device, the method comprising: decoding a notification update frame received from a peer Wi-Fi device, wherein the notification update frame includes an updated first Operation Information attribute of the peer Wi-Fi device to indicate a maximum transmit power of the peer Wi-Fi device and an updated first Transmit Power Envelop (TPE) element to indicate an updated first transmit power level of the peer Wi-Fi device; and updating, in response to the notification update frame, transmit power configuration of the Wi-Fi device.

Example 80 includes the method of Example 79, wherein: the notification update frame includes an Operation Notification frame; or the notification update frame includes a Beacon frame when the peer Wi-Fi device operates as a Group Owner.

Example 81 includes the method of Example 80, wherein the Wi-Fi device and the peer Wi-Fi device are operable with Wi-Fi Direct technology.

Example 82 includes the method of Example 79, wherein the notification update frame includes a Schedule Update Notification frame or an Operation Notification frame.

Example 83 includes the method of Example 82, wherein the Wi-Fi device and the peer Wi-Fi device are operable with Wi-Fi Aware technology.

Example 84 includes a method for a Wireless Fidelity (Wi-Fi) device, the method comprising: encoding a first operation setup frame for transmission to a peer Wi-Fi device, wherein the first operation setup frame includes a first Operation Information attribute to indicate a first operation mode of the Wi-Fi device and a first Transmit Power Envelop (TPE) element of the Wi-Fi device to indicate a first transmit power level of the Wi-Fi device; and decoding, in response to the first operation setup frame, a second operation setup frame received from the peer Wi-Fi device, wherein the second operation setup frame includes a second Operation Information attribute to indicate a second operation mode of the peer Wi-Fi device and a second TPE element to indicate a second transmit power level of the peer Wi-Fi device.

Example 85 includes the method of Example 84, wherein: the first operation setup frame includes a Provision Discovery Request frame, and the second operation setup frame includes a Provision Discovery Response frame; the first operation setup frame includes a first Data Path Request frame, and the second operation setup frame includes a second Data Path Response frame; the first operation setup frame includes a first Ranging Request frame, and the second operation setup frame includes a second Ranging Response frame; or the first operation setup frame includes a first Schedule Request frame, and the second operation setup frame includes a second Schedule Response frame.

Example 86 includes a method for a Wireless Fidelity (Wi-Fi) device, the method comprising: determining that an operation mode of the Wi-Fi device is changed; and encoding an Operation Information attribute in an Operation Notification frame, for transmission to a peer Wi-Fi device, wherein the Operation Information attribute is to indicate the changed operation mode of the Wi-Fi device.

Example 87 includes the method of Example 86, wherein the processor circuitry is to: determining that a transmit power level of the Wi-Fi device is changed; and encoding a Transmit Power Envelop (TPE) element in the Operation Notification frame to indicate the changed transmit power level of the Wi-Fi device.

Example 88 includes the method of Example 86, wherein the Operation Notification frame further includes a Country element of the Wi-Fi device to indicate regulatory domain information of the Wi-Fi device.

Example 89 includes the method of Example 86, wherein the operation mode is operable in an Institute of Electrical and Electronics Engineers (IEEE) country element and an operating class.

Example 90 includes a method for a Wireless Fidelity (Wi-Fi) device, the method comprising: encoding a first discovery frame for transmission to a peer Wi-Fi device, wherein the first discovery frame includes a first Operation Information attribute to indicate a first operation mode of the Wi-Fi device; and decoding, in response to the first discovery frame, a second discovery frame received from the peer Wi-Fi device, wherein the second discovery frame includes a second Operation Information attribute to indicate a second operation mode of the peer Wi-Fi device.

Example 91 includes the method of Example 90, wherein: the first discovery frame includes a Probe Request frame, and the second discovery frame includes a Probe Response frame; or the first discovery frame includes a first Beacon frame, and the second discovery frame includes a second Beacon frame.

Example 92 includes the method of Example 91, wherein the Wi-Fi device and the peer Wi-Fi device are operable with Wi-Fi Direct technology.

Example 93 includes the method of Example 90, wherein the first discovery frame includes a first Neighbor Awareness Networking (NAN) Discovery frame, and the second discovery frame includes a second NAN Discovery frame.

Example 94 includes the method of Example 93, wherein the Wi-Fi device and the peer Wi-Fi device are operable with Wi-Fi Aware technology.

Example 95 includes the method of Example 90, wherein the first operation mode and the second operation mode are operable in an Institute of Electrical and Electronics Engineers (IEEE) country element and an operating class.

Example 96 includes the method of Example 90, wherein each of the first operation mode and the second operation mode includes a device class/category, a form factor or a regulatory mode as specified in a Wi-Fi protocol or a non-Wi-Fi protocol.

Example 96a includes the method of Example 96, wherein the regulatory mode includes a Standard Power (SP) mode, a Low Power Indoor (LPI) mode, a Very Low Power (VLP) mode, or a VLP On-body mode.

Example 97 includes one or more computer-readable media having instructions stored thereon, the instructions when executed by processor circuitry cause the processor circuitry to perform the method of any one of Examples 65 to 83.

Example 98 includes one or more computer-readable media having instructions stored thereon, the instructions when executed by processor circuitry cause the processor circuitry to perform the method of any one of Examples 84 to 96.

Example 99 includes a Wireless Fidelity (Wi-Fi) device as shown and described in the description.

Example 100 includes a method performed at a Wireless Fidelity (Wi-Fi) device as shown and described in the description.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The phrases "in an embodiment" "in one embodiment" and "in some embodiments" are used repeatedly herein. The phrase generally does not refer to the same embodiment; however, it may.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for a Wireless Fidelity (Wi-Fi) device, comprising:
   communications circuitry; and
   processing circuitry coupled with the communications circuitry and configured to:
      decode a request frame received from a peer device, the request frame including a first attribute element to indicate a first operation mode of the peer device; and
      encode, in response to the request frame, a response frame for transmission to the peer device, the response frame including a second attribute element to indicate a second operation mode of the Wi-Fi device,
      wherein the request frame comprises a Neighbor Awareness Networking (NAN) Data Path Request frame, and the response frame comprises a NAN Data Path Response frame.

2. The apparatus of claim 1, wherein the first attribute and the second attribute each include an attribute ID field to identify the type of Neighbor Awareness Networking (NAN) attribute.

3. The apparatus of claim 1, wherein the first attribute and the second attribute each include a length field to indicate the length of the fields in the attribute that follows the length field.

4. The apparatus of claim 1, wherein the first attribute and the second attribute each include an information field to indicate the first and second operation modes with different values.

5. The apparatus of claim 1, wherein the request frame further includes a country element to indicate regulatory domain information of the peer device.

6. The apparatus of claim 1, wherein the response frame further includes a country element to indicate regulatory domain information of the Wi-Fi device.

7. The apparatus of claim 1, wherein the Wi-Fi device and the peer device are Wi-Fi Aware devices.

8. A one or more non-transitory computer-readable media having instructions stored thereon, the instructions when executed by processing circuitry of a Wireless Fidelity (Wi-Fi) device, cause the processing circuitry to:
   decode a request frame received from a peer device, the request frame including a first attribute element to indicate a first operation mode of the peer device; and
   encode, in response to the request frame, a response frame for transmission to the peer device, the response frame including a second attribute element to indicate a second operation mode of the Wi-Fi device,
   wherein the request frame comprises a Neighbor Awareness Networking (NAN) Data Path Request frame, and the response frame comprises a NAN Data Path Response frame.

9. The one or more non-transitory computer-readable media of claim 8, wherein the first attribute and the second attribute each include an attribute ID field to identify the type of Neighbor Awareness Networking (NAN) attribute.

10. The one or more non-transitory computer-readable media of claim 8, wherein the first attribute and the second attribute each include a length field to indicate the length of the fields in the attribute that follows the length field.

11. The one or more non-transitory computer-readable media of claim 8, wherein the first attribute and the second attribute each include an information field to indicate the first and second operation modes with different values.

12. The one or more non-transitory computer-readable media of claim 8, wherein the request frame further includes a country element to indicate regulatory domain information of the peer device.

13. The one or more non-transitory computer-readable media of claim 8, wherein the response frame further includes a country element to indicate regulatory domain information of the Wi-Fi device.

14. The one or more non-transitory computer-readable media of claim 8, wherein the Wi-Fi device and the peer device are Wi-Fi Aware devices.

15. An apparatus for a Wireless Fidelity (Wi-Fi) device, comprising:
   communications circuitry; and
   processing circuitry coupled with the communications circuitry and configured to:
      encode a request frame for transmission to a peer device, the request frame including a first attribute element to indicate a first operation mode of the Wi-Fi device; and
      decode a response frame received from the peer device, the response frame including a second attribute element to indicate a second operation mode of the peer device,
      wherein the request frame comprises a Neighbor Awareness Networking (NAN) Data Path Request frame, and the response frame comprises a NAN Data Path Response frame.

16. The apparatus of claim 15, wherein the first attribute and the second attribute each include an attribute ID field to identify the type of Neighbor Awareness Networking (NAN) attribute.

17. The apparatus of claim 15, wherein the first attribute and the second attribute each include a length field to indicate the length of the fields in the attribute that follows the length field.

18. The apparatus of claim 15, wherein the first attribute and the second attribute each include an information field to indicate the first and second operation modes with different values.

19. The apparatus of claim 15, wherein the request frame further includes a country element to indicate regulatory domain information of the Wi-Fi device.

20. The apparatus of claim 15, wherein the response frame further includes a country element to indicate regulatory domain information of the peer device.

21. The apparatus of claim 15, wherein the Wi-Fi device and the peer device are Wi-Fi Aware devices.

* * * * *